(12) United States Patent
Goldman

(10) Patent No.: US 12,239,924 B2
(45) Date of Patent: Mar. 4, 2025

(54) COLLAR HAVING MODULAR PARTS FOR SUPPORTING STRATIFIED FILTRATION

(71) Applicant: MECHANICAL MANUFACTURING CORPORATION, Sunrise, FL (US)

(72) Inventor: Michael A. Goldman, Sunrise, FL (US)

(73) Assignee: Mechanical Manufacturing Corporation, Sunrise, FL (US)

( * ) Notice: Subject to any disclaimer, the term of this patent is extended or adjusted under 35 U.S.C. 154(b) by 148 days.

(21) Appl. No.: 18/160,158

(22) Filed: Jan. 26, 2023

(65) Prior Publication Data
US 2024/0252959 A1    Aug. 1, 2024

(51) Int. Cl.
*B01D 29/15* (2006.01)
*B01D 29/58* (2006.01)

(52) U.S. Cl.
CPC ............. *B01D 29/15* (2013.01); *B01D 29/58* (2013.01); *B01D 2201/0415* (2013.01); *B01D 2201/287* (2013.01); *B01D 2201/342* (2013.01); *B01D 2201/4084* (2013.01)

(58) Field of Classification Search
None
See application file for complete search history.

(56) References Cited

U.S. PATENT DOCUMENTS

| | | | | |
|---|---|---|---|---|
| 1,044,074 A | * | 11/1912 | Nugent | B01D 35/18 210/187 |
| 1,331,732 A | * | 2/1920 | Wait | B01D 63/089 210/489 |
| 3,419,151 A | * | 12/1968 | Wrotnowski | B01D 29/27 210/489 |
| 3,640,392 A | * | 2/1972 | Smith | B01D 29/23 55/378 |
| 3,771,664 A | * | 11/1973 | Schrink | B01D 29/27 55/378 |
| 3,774,769 A | * | 11/1973 | Smith | B01D 29/23 210/232 |
| 3,814,261 A | * | 6/1974 | Morgan, Jr. | B01D 29/90 210/453 |
| 3,931,015 A | * | 1/1976 | Jenkins | B01D 29/27 210/450 |
| 3,959,137 A | * | 5/1976 | Kirsgalvis | B01D 29/902 210/791 |

(Continued)

*Primary Examiner* — Robert J Popovics
(74) *Attorney, Agent, or Firm* — Fox Rothschild LLP; Carol E. Thorstad-Forsyth

(57) ABSTRACT

Systems and methods comprising using a filter element assembly. The methods comprise: placing a first sealing member in a channel formed in a first collar piece which has a first filter element coupled thereto; inserting a second filter element coupled to a second collar piece through the input orifice of the first collar piece and into the first filter element; causing the first collar piece to snap-fit engage a flange of the second collar piece; using the first sealing member to provide a seal between the first and second collar pieces which are snap-fit engaged with one another; receiving a fluid in an input orifice of the second collar piece; performing a first-stage filtering process using the second filter element to remove contaminants from the fluid; and performing a subsequent second-stage filtering process using the first filter element to further remove contaminants from the fluid.

9 Claims, 15 Drawing Sheets

(56) References Cited

U.S. PATENT DOCUMENTS

| | | | | |
|---|---|---|---|---|
| 4,022,693 A * | 5/1977 | Morgan, Jr. | B01D 29/902 | 210/345 |
| 4,081,379 A * | 3/1978 | Smith | B01D 29/15 | 210/232 |
| 4,133,769 A * | 1/1979 | Morgan, Jr. | B01D 29/27 | 210/477 |
| 4,157,964 A * | 6/1979 | Rishel | B01D 29/23 | 55/378 |
| 4,204,966 A * | 5/1980 | Morgan, Jr. | B01D 29/27 | 210/450 |
| 4,253,959 A * | 3/1981 | Tafara | B01D 29/27 | 210/232 |
| 4,282,098 A * | 8/1981 | Morgan, Jr. | B01D 35/30 | 210/232 |
| 4,283,281 A * | 8/1981 | Cogan | B01D 29/23 | 210/453 |
| 4,285,814 A * | 8/1981 | Morgan, Jr. | B01D 29/23 | 210/453 |
| 4,322,293 A * | 3/1982 | Morgan, Jr. | B01D 29/27 | 210/345 |
| 4,390,425 A * | 6/1983 | Tafara | B01D 29/902 | 210/232 |
| 4,419,240 A * | 12/1983 | Rosaen | B01D 29/27 | 210/453 |
| 4,436,621 A * | 3/1984 | Picker | B01D 29/03 | 55/378 |
| 4,460,468 A * | 7/1984 | Morgan | B01D 29/90 | 210/453 |
| 4,490,253 A * | 12/1984 | Tafara | B01D 29/27 | 29/451 |
| 4,496,459 A * | 1/1985 | Rosaen | B01D 29/15 | 210/489 |
| 4,526,689 A * | 7/1985 | Morgan | B01D 29/117 | 210/345 |
| 4,539,116 A * | 9/1985 | Morin | B01D 29/27 | 210/450 |
| 4,552,661 A * | 11/1985 | Morgan | B01D 29/23 | 210/232 |
| 4,610,787 A * | 9/1986 | Morgan | B01D 29/15 | 210/455 |
| 4,669,167 A * | 6/1987 | Asterlin | B01D 29/23 | 29/451 |
| 4,701,259 A * | 10/1987 | Rosaen | B01D 29/27 | 210/450 |
| 4,775,469 A * | 10/1988 | Zimmerly | B01D 29/27 | 55/378 |
| 4,818,398 A * | 4/1989 | Lott | B01D 29/23 | 210/287 |
| 4,913,815 A * | 4/1990 | Shulda | B01D 29/15 | 210/287 |
| 4,921,606 A * | 5/1990 | Goldman | B01D 29/27 | 55/378 |
| 4,948,504 A * | 8/1990 | Kierdorf | B01D 29/27 | 210/453 |
| 4,966,697 A * | 10/1990 | Rosaen | B01D 29/27 | 210/450 |
| 4,986,912 A * | 1/1991 | Fisch | B01D 29/27 | 55/363 |
| 5,006,243 A * | 4/1991 | Arnaud | B01D 29/27 | 210/232 |
| 5,015,376 A * | 5/1991 | Picek | B01D 63/00 | 210/321.86 |
| 5,028,323 A * | 7/1991 | Gould | B01D 29/52 | 210/450 |
| 5,039,410 A * | 8/1991 | Gershenson | B01D 29/27 | 210/232 |
| 5,045,194 A * | 9/1991 | Gershenson | B01D 29/23 | 210/232 |
| 5,075,004 A * | 12/1991 | Gershenson | B01D 29/27 | 210/453 |
| 5,137,632 A * | 8/1992 | Morgan, Jr. | B01D 29/23 | 210/453 |
| 5,139,672 A * | 8/1992 | Ohbayashi | B01D 29/27 | 210/453 |
| 5,167,680 A * | 12/1992 | Gardner | A47L 9/1427 | 55/508 |
| 5,188,731 A * | 2/1993 | Lapoint, Jr. | B01D 29/27 | 210/232 |
| 5,192,424 A * | 3/1993 | Beyne | B01D 29/23 | 210/453 |
| 5,246,581 A * | 9/1993 | Goldman | B01D 29/96 | 210/453 |
| 5,279,732 A * | 1/1994 | Edens | B01D 29/33 | 210/453 |
| 5,290,441 A * | 3/1994 | Griffin | B01D 46/06 | 210/232 |
| 5,358,638 A * | 10/1994 | Gershenson | B01D 29/58 | 210/453 |
| 5,376,271 A * | 12/1994 | Morgan, Jr. | B01D 29/96 | 210/453 |
| 5,417,855 A * | 5/1995 | Gershenson | B01D 29/58 | 210/441 |
| 5,441,650 A * | 8/1995 | Kirsgalvis | B01D 29/27 | 210/455 |
| 5,624,559 A * | 4/1997 | Levin | B01D 29/23 | 210/470 |
| 5,643,451 A * | 7/1997 | Harris | B01D 29/27 | 210/453 |
| 5,750,022 A * | 5/1998 | Blake | E04H 4/1636 | 210/406 |
| 5,770,066 A * | 6/1998 | Coates | B01D 29/668 | 210/450 |
| 5,770,077 A * | 6/1998 | Goldman | B32B 5/022 | 156/290 |
| 5,840,188 A * | 11/1998 | Kirsgalvis | B01D 29/23 | 210/455 |
| 5,893,969 A * | 4/1999 | Goldman | B01D 35/30 | 210/143 |
| 5,989,421 A * | 11/1999 | Davis | B01D 29/96 | 210/477 |
| 6,030,531 A * | 2/2000 | Gershenson | B01D 29/92 | 277/630 |
| 6,136,076 A * | 10/2000 | Read | B01D 46/0005 | 55/508 |
| 6,136,192 A * | 10/2000 | Booth | B01D 29/23 | 210/450 |
| 6,238,560 B1 * | 5/2001 | Gershenson | B01D 29/15 | 210/342 |
| 6,245,130 B1 * | 6/2001 | Maybee | B01D 29/15 | 95/286 |
| 6,511,598 B2 * | 1/2003 | Gershenson | B01D 29/52 | 210/342 |
| 6,511,606 B2 * | 1/2003 | Goldman | B01D 29/58 | 210/485 |
| 6,585,892 B2 * | 7/2003 | Gershenson | B01D 29/92 | 210/337 |
| 6,585,893 B2 * | 7/2003 | Gershenson | B01D 29/58 | 210/345 |
| 6,592,758 B2 * | 7/2003 | Quintel | B01D 29/668 | 210/411 |
| 6,702,294 B2 * | 3/2004 | Sassi | F16J 15/3268 | 277/572 |
| 6,706,198 B2 * | 3/2004 | Gershenson | B01D 29/114 | 210/767 |
| 6,712,967 B2 * | 3/2004 | Gershenson | B01D 29/902 | 210/345 |
| 6,755,207 B1 * | 6/2004 | Curtis | F04F 5/20 | 137/205 |
| 6,827,852 B2 * | 12/2004 | Fuentes | B01D 29/96 | 220/613 |
| 6,840,385 B2 * | 1/2005 | Goldman | B01D 29/27 | 210/489 |
| 6,949,188 B2 * | 9/2005 | Geyer | B01D 29/23 | 210/453 |
| 6,966,444 B2 * | 11/2005 | Morgan | B01D 29/27 | 210/453 |
| 7,001,517 B2 * | 2/2006 | Gershenson | B01D 29/54 | 210/451 |

(56) References Cited

U.S. PATENT DOCUMENTS

| | | | |
|---|---|---|---|
| 7,011,754 B2* | 3/2006 | Chang | B01D 29/27 210/453 |
| 7,073,670 B2* | 7/2006 | Fall | B01D 29/96 210/477 |
| 7,175,030 B2* | 2/2007 | Fall | B01D 29/96 55/378 |
| 7,329,296 B2* | 2/2008 | Jensen | B01D 46/02 210/488 |
| 7,832,735 B2* | 11/2010 | Paykin | F16J 15/064 277/568 |
| 7,857,144 B1* | 12/2010 | Asterlin | B01D 29/27 210/474 |
| D636,055 S * | 4/2011 | Goldman | D23/209 |
| 7,938,276 B2* | 5/2011 | Goldman | B01D 29/27 210/502.1 |
| 7,959,803 B2* | 6/2011 | Antoun | B01D 29/96 210/453 |
| 7,993,520 B2* | 8/2011 | Goldman | B01D 29/58 210/322 |
| 8,052,151 B2* | 11/2011 | Kurth | F16L 27/0816 277/572 |
| 8,142,668 B2* | 3/2012 | Goldman | B01D 29/58 210/806 |
| 8,182,564 B2* | 5/2012 | Howard | B01D 46/02 55/482 |
| 8,192,621 B2* | 6/2012 | Ferraresi | B01D 35/16 210/453 |
| 8,257,591 B2* | 9/2012 | Goldman | B01D 29/58 210/322 |
| 8,323,493 B2* | 12/2012 | Quintel | B01D 29/56 210/500.1 |
| 8,413,309 B2* | 4/2013 | Goodge | B01D 29/52 210/232 |
| 8,753,510 B2* | 6/2014 | Jacobs | B01D 29/27 55/482 |
| 8,815,086 B2* | 8/2014 | Morgan | B01D 35/143 210/450 |
| 8,978,898 B2* | 3/2015 | Sakairi | B01D 29/27 210/450 |
| 9,630,127 B2* | 4/2017 | Hoots | B01D 29/27 |
| 9,914,076 B2* | 3/2018 | Koreis | B01D 29/114 |
| 10,071,340 B2* | 9/2018 | Castellino | B01D 53/86 |
| 10,413,850 B2* | 9/2019 | Taddei | B08B 15/04 |
| 10,485,915 B2* | 11/2019 | Carmody | B01D 29/54 |
| 10,639,575 B2* | 5/2020 | Morgan | B01D 46/0005 |
| D894,328 S * | 8/2020 | Goldman | D23/209 |
| 11,123,663 B2* | 9/2021 | Koreis | B01D 29/114 |
| 11,904,261 B2* | 2/2024 | Paz | B01D 29/27 |
| 11,925,887 B2* | 3/2024 | Gaertig | B01D 29/27 |
| 12,121,831 B2* | 10/2024 | Paz | B01D 35/16 |
| 2001/0035380 A1* | 11/2001 | Goldman | B01D 29/58 210/808 |
| 2002/0074280 A1* | 6/2002 | Goldman | B01D 29/27 210/489 |
| 2004/0007515 A1* | 1/2004 | Geyer | B01D 29/902 210/450 |
| 2004/0154976 A1* | 8/2004 | Fuentes | B01D 29/96 210/489 |
| 2005/0055989 A1* | 3/2005 | Morgan | B01D 29/27 55/378 |
| 2005/0138903 A1* | 6/2005 | Jensen | B01D 46/02 55/361 |
| 2007/0158917 A1* | 7/2007 | Paykin | F16J 15/064 277/551 |
| 2007/0175817 A1* | 8/2007 | Goldman | B01D 29/27 210/502.1 |
| 2009/0101596 A1* | 4/2009 | Goldman | B01D 29/58 210/335 |
| 2009/0107930 A1* | 4/2009 | Goldman | B01D 29/58 210/806 |
| 2010/0176046 A1* | 7/2010 | Goldman | B01D 29/27 210/450 |
| 2011/0259837 A1* | 10/2011 | Goldman | B01D 29/58 210/806 |
| 2013/0056406 A1* | 3/2013 | Jacobs | B01D 29/58 210/342 |
| 2015/0008176 A1* | 1/2015 | Morgan, III | B01D 29/25 210/450 |
| 2015/0014256 A1* | 1/2015 | Koreis | B01D 29/27 210/238 |
| 2015/0217213 A1* | 8/2015 | Morgan, III | B01D 29/58 210/335 |
| 2017/0080387 A1* | 3/2017 | Castellino | B01D 46/64 |
| 2018/0207562 A1* | 7/2018 | Taddei | B08B 3/08 |
| 2022/0047975 A1* | 2/2022 | Johnson | B01D 29/58 |
| 2022/0314146 A1* | 10/2022 | Gaertig | B01D 29/27 |
| 2024/0252959 A1* | 8/2024 | Goldman | B01D 29/58 |

* cited by examiner

COLLAR HAVING MODULAR PARTS FOR SUPPORTING STRATIFIED FILTRATION

BACKGROUND

Description of the Related Art

A filtration system typically consists of a filter element assembly for use in a pressurized filter system. The filter element assembly typically includes a plastic collar coupled to a cylindrical filter element. The filter element is closed at one end and fused to the plastic collar at an opposing end. The filter element is composed of one or more layers of filtering medium. The filtering medium is typically made of a micro-fiber material having pores to control fluid flow. The layers of filtering medium can have a uniform pore structure, a graded pore structure, or a tapered pore structure. A tapered or graded pore structure provides a filtering material whereby the pore size decreases in the direction of fluid flow. A multi-layer filter structure provides a filtering system able to collect contaminants at each layer of filtering medium.

The pressurized filter system utilizing the filter element assembly is typically comprised of a filter housing and a housing lid. The filter housing often includes a removable filter basket disposed therein for supporting the filter element. The filter basket and the plastic collar of the filter element assembly rest in an annular channel disposed in the top of the filter housing. The housing lid is removably secured to the top of the filter housing. When the housing lid is closed and secured, an a-ring seal disposed on or in the housing lid forms a seal with an upper surface of the filter housing. A contaminated fluid is pumped into the filter housing through an input orifice of the filter housing. The contaminated fluid is filtered as it flows through the filter element and then exists through an output orifice of the filter housing.

SUMMARY

This document concerns systems and methods for using a filter element assembly. The methods comprise: placing a first sealing member in a channel formed in a first collar piece which has a first filter element coupled thereto (where the first filter element has a tubular form that is closed at a first end and affixed to the first collar piece at an opposing second end to define an input orifice of the first collar piece); inserting a second filter element coupled to a second collar piece through the input orifice of the first collar piece and into the first filter element (where the second filter element having an overall size smaller than an overall size of the first filter element); causing the first collar piece to snap-fit engage a flange of the second collar piece; using the first sealing member to provide a seal between the first and second collar pieces which are snap-fit engaged with one another; receiving a fluid in an input orifice of the second collar piece; performing a first-stage filtering process using the second filter element to remove contaminants from the fluid; and performing a subsequent second-stage filtering process using the first filter element to further remove contaminants from the fluid.

The methods may also comprise: placing a second sealing member in a channel formed in an exposed surface of the second collar piece; and using the second sealing member to provide a seal between the second collar piece and a filter housing.

The methods may alternatively or additionally comprise replacing the first collar piece with an interchangeable third collar piece by: causing the first collar piece to no longer snap-fit engage the flange of the second collar piece; and causing the interchangeable third collar piece to snap-fit engage the flange of the second collar piece. The interchangeable third collar piece has a third filter element coupled thereto which is different than the first filter element. The first-stage filtering process may be repeated using the second filter element to remove contaminants from the fluid or another fluid, and the subsequent second-stage filtering process may be repeated using the third filter element to further remove contaminants from the fluid or the another fluid.

The methods may alternatively or additionally comprise replacing the second collar piece with an interchangeable fourth collar piece by: causing the first collar piece to no longer snap-fit engage the flange of the second collar piece; and causing the first collar piece to snap-fit engage a flange of the interchangeable fourth collar piece. The interchangeable fourth collar piece has a fourth filter element coupled thereto which is different than the second filter element. The first-stage filtering process may be repeated using the fourth filter element to remove contaminants from the fluid or another fluid, and the subsequent second-stage filtering process may be repeated using the first filter element to further remove contaminants from the fluid or the another fluid.

This document also concerns a filter element assembly. The filter element assembly comprises: a first collar piece; a first filter element coupled to the first collar piece and having a tubular form that is closed at a first end and affixed to the first collar piece at an opposing second end to define an input orifice of the first collar piece; a first sealing member disposed in a channel formed in the first collar piece; a second collar piece; and a second filter element coupled to a second collar piece, having an overall size smaller than an overall size of the first filter element, and being inserted into through the input orifice of the first collar piece and into the first filter element. The first collar piece is snap-fit engaged with a flange of the second collar piece. The first sealing member provides a seal between the first and second collar pieces. The second collar piece has an input orifice into which a fluid is receivable. The second filter element is configured to remove contaminants from the fluid during a first-stage filtering process, and the first filter element is configured to further remove contaminants from the fluid during a subsequent second-stage filtering process.

The filter element assembly may also comprise a second sealing member disposed in a channel formed in an exposed surface of the second collar piece. The second sealing member is configured to provide a seal between the second collar piece and a filter housing.

The filter element assembly may alternatively or additionally comprises a third collar piece with which the first collar piece is interchangeable. The third collar piece has a third filter element coupled thereto which is different than the first filter element. The third filter element is configured to remove contaminants from the fluid or another fluid when the subsequent second-stage filtering process is repeated.

The filter element assembly may alternatively or additionally comprise a fourth collar piece with which the second collar piece is interchangeable. The fourth collar piece has a fourth filter element coupled thereto which is different than the second filter element. The fourth filter element is configured to remove contaminants from the fluid or another fluid when the first-stage filtering process is repeated.

The implementing system can comprise a processor and a non-transitory computer-readable storage medium comprising programming instructions that are configured to cause the processor to implement a method for mitigating interference. Alternatively or additionally, the implementing system may include logic circuits (e.g., subtractors, adders, multipliers, etc.), passive circuit components (e.g., resistors, capacitors, switches, delays, etc.) and/or other active circuit components (e.g., transistors, demodulators, modulators, combiners, etc.).

BRIEF DESCRIPTION OF THE DRAWINGS

This disclosure is facilitated by reference to the following drawing figures, in which like numerals represent like items throughout the figures.

DETAILED DESCRIPTION

Figure 1:
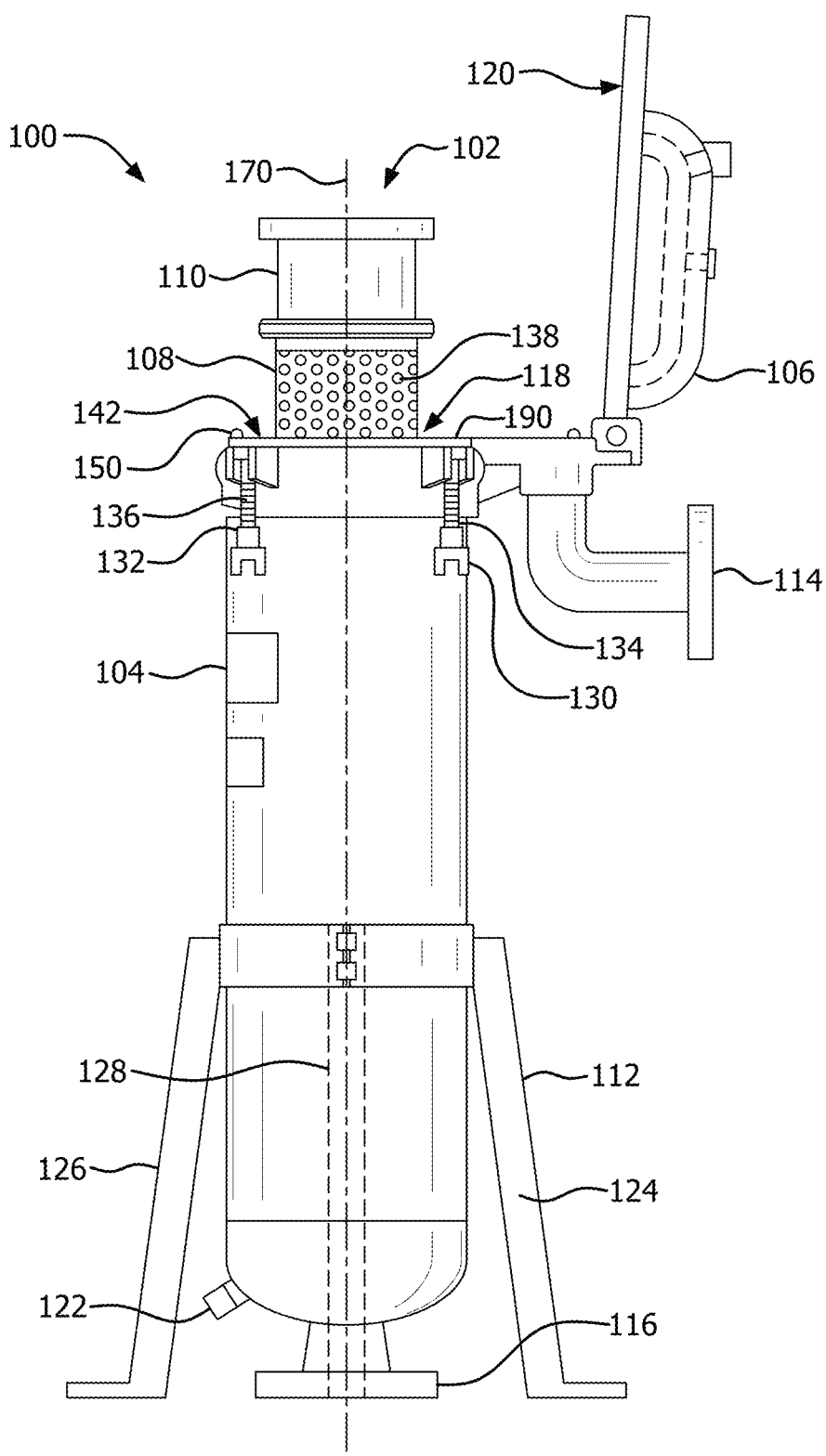
FIG. 1 is an illustration of a filtration system.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Before describing the systems and methods of the present invention, it will be helpful in understanding an exemplary environment in which the invention can be utilized. Systems and methods of the present invention can be utilized in a variety of different applications where organic contaminants, color, odor, or even chlorination need to be removed from liquids or fluids. Such applications include, but are not limited to, water filtration applications, oil filtration application, paint filtra-tion applications, air filtration applications, gas filtration applications, and exhaust filtration applications.

FIG. 1 shows a filtration system 100 implementing the present solution. Although the filtration system 100 shown in FIG. 1 has a vertical configuration, the present solution is not limited in this regard. For example, the present solution can be used in a filtration system having a vertical configuration (as shown in FIG. 1) and/or a horizontal configuration (not shown).

As shown in FIG. 1, the filtration system 100 comprises a pressurized filter housing 102 having a body 104 and a cover 106 in an open position. The filter housing 102 is comprised of a mounting stand 112, an input orifice 114, an output orifice 116, and a drain 122. Although the input orifice 114 is located at the top of the filter housing 102 as shown in FIG. 1, the present solution is not limited in this regard. For example, the input orifice 114 can be located at the bottom of the filter housing 102. In such a scenario, the output orifice 116 is located at the top or a side of the filter housing 102 (rather than on the bottom of the filter housing 102 as shown in FIG. 1).

The mounting stand 112 includes a plurality of legs 124, 126, 128. The filter housing 102 is also comprised of a pair of locking bar nuts 130, 132 disposed on pivotable bolts 134, 136, respectively. The locking bar nuts and bolts 130, 132, 134, 136 facilitate the securement of the cover 106 to the filter housing 102. The filter housing 102 also comprises at least one sidewall 190 defining an interior space 190 configured for receiving a filter element assembly 110 therein. The cover 106 is secured to the filter housing 102 so as to be removable from a first position in which the cover 106 encloses the interior space 192 and a second position in which the interior space 192 is accessible for receiving the filter element assembly 110 therein.

The filtration system 100 also comprises a filter basket 108 having the filter element assembly 110 placed therein. The filter basket 108 supports the filter element assembly 110 in the filter housing 102. The filter basket 108 has apertures 138 formed therein for permitting liquids and/or fluids to pass therethrough. The filter basket 108 and filter element assembly 110 will be described in more detail below.

During operation, the cover 106 is in its closed position (not shown). In the closed position, the cover 106 applies a downward pressure (or compressive force) on a ring gasket 150 circumferentially disposed around a central axis 170 between the filter housing 102 and the cover 106. As a result of the applied pressure (or compressive force), the ring gasket 150 provides a seal between the filter housing 102 and the cover 106. The cover 106 also applies a downward pressure (or compressive force) on the filter basket 108 and/or the filter element assembly 110 resting in an annular channel 118 disposed in the top of the filter housing 102. As a result of the applied pressure (or compressive force), at least one of the filter components 108, 110 provides a fluid-tight seal between itself and the filter housing 102. Each filter component 108, 110 also provides a fluid-tight seal between itself and a surface 120 of the cover 106. A contaminated liquid or fluid (not shown) is then pumped into the filter housing 102 through the input orifice 114. The contaminated liquid or fluid (not shown) is filtered as it flows through the filter element assembly 110 and then exists the filter housing 102 through the output orifice 116 thereof.

Figure 2:
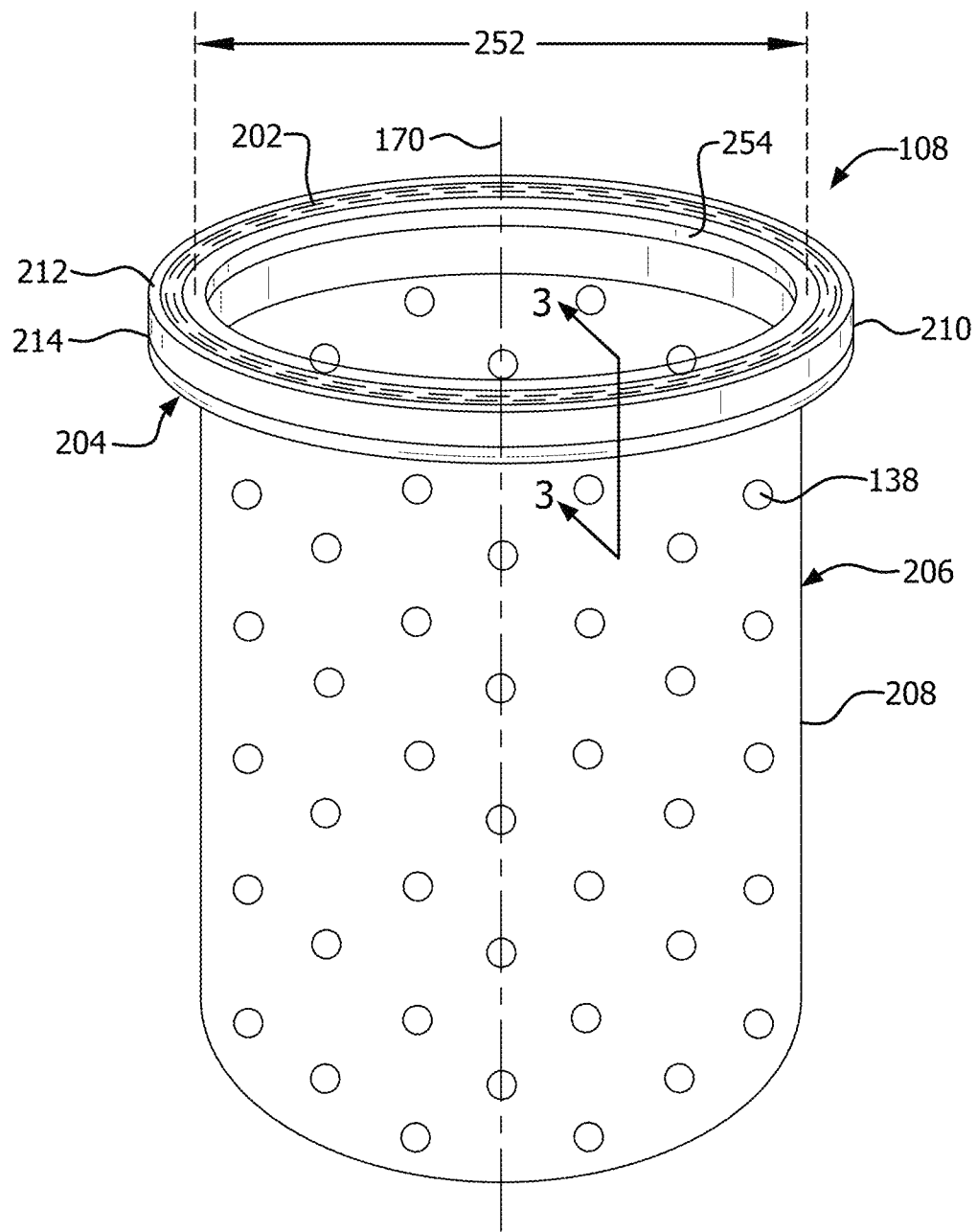
FIG. 2 is an illustration of a filter basket.
Figure 3:
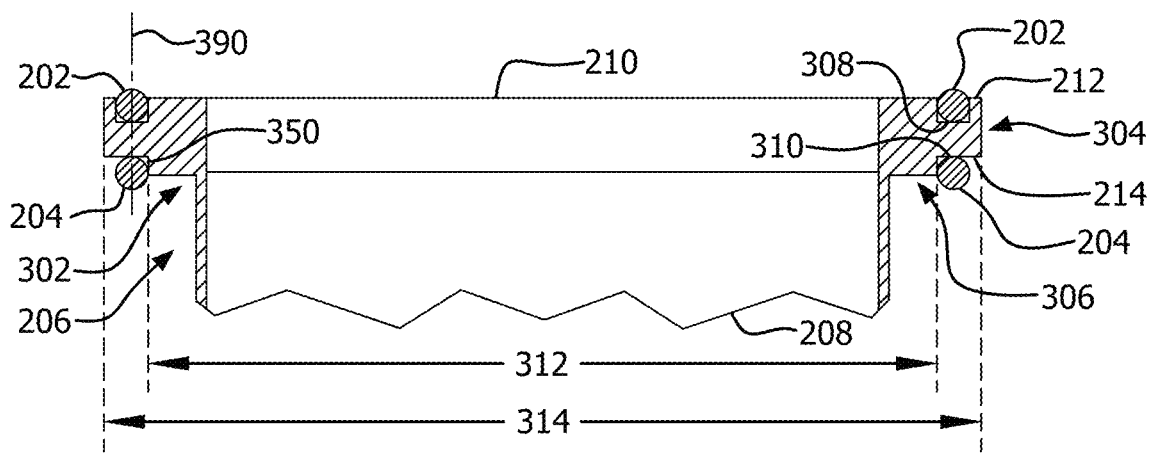
FIG. 3 is a cross-sectional view of the filter basket taken across line 3-3 of FIG. 2.

The filter basket 108 will now be described in relation to FIGS. 2-3. FIG. 2 provides a perspective view of the filter basket 108. FIG. 3 is a cross-sectional view of the filter basket 108 taken along lines 3-3 of FIG. 2. As shown in FIGS. 2-3, the filter basket 108 can comprise ring gaskets 202, 204 and a body 206. The present solution is not limited in this regard. The filter basket 108 can have any dimensions (e.g., length and width) selected in accordance with a particular filtration application.

The body 206 generally includes a continuous annular sidewall 208 disposed around the central axis 170 and a flange 210 extending radially outward from an edge 302 of the annular sidewall 208. The present solution is not limited in this regard. For example, the body 206 can include an annular sidewall 208 and a collar (not shown) coupled thereto. The collar (not shown) can have the ring gaskets 202, 204 disposed thereon so as to be vertically aligned with respect to each other, i.e., a first ring gasket 202 is coaxial with the second ring gasket 204. The body 206 can also include a hollow member (not shown) projecting inward from a bottom surface thereof. The hollow member (not shown) can have apertures (not shown) formed therein for permitting liquids and/or fluids to pass therethrough. The hollow member (not shown) can be provided to support a filter element (not shown) configured for filtering a fluid flowing from an outer surface (not shown) thereof to an inner surface (not shown) thereof.

Referring again to FIGS. 2-3, the annular sidewall 208 can have any shape selected in accordance with a particular filtration application. Such shapes include, but are not limited to, circular shapes (as shown in FIG. 2), hex shapes (not shown), and rectangular shapes (not shown). Similarly, the flange (or collar) 210 can have any shape selected in accordance with a particular filtration system application. For example, the flange (or collar) 210 can have a circular shape (as shown in FIG. 2), a hex shape (not shown), and/or a rectangular shape (not shown). For convenience, the present solution is described in terms of a circular profile. Those skilled in the art will appreciate that different shaped ring gaskets 202, 204 will be required for alternatively shaped flanges 210.

As shown in FIGS. 2-3, the flange (or collar) 210 has a first face 212 and an opposing second face 214. Each of the faces 212, 214 has a respective ring gasket 202, 204 disposed thereon. Notably, the ring gaskets 202, 204 are in vertical alignment with each other. The ring gasket 202 is positioned coaxial to the a-ring gasket 204. In this coaxial position, the central y-axis 390 of the ring gaskets 202, 204 can be aligned with each other (as shown in FIG. 3). The rings gasket 202 is disposed at a first location 254 on the first face 212 that is aligned with a second location (not visible in FIG. 2) on the second face 214 at which the second ring gasket 204 is disposed. This vertical alignment of the ring gaskets 210, 212 ensures that fluid-tight seals are formed between the flange (or collar) 210 and a surrounding structure (e.g., the pressurized filter housing 102 of FIG. 1). The fluid-tight seals prevent the escape of liquids and/or fluids from the pressurized filter housing 102 when they are being pumped therethrough.

The ring gaskets 202, 204 are of approximately equal inside diameters. Similarly, the ring gaskets 202, 204 can have approximately equal radial cross sections and axial cross sections. Alternatively, the ring gaskets 202, 204 can have respective inside diameters, radial cross sections, and axial cross sections that are different relative to each other.

As shown in FIG. 3, the flange (or collar) 210 comprises a first flange structure 304 and a second flange structure 306 coupled to the first flange structure 304. The first and second flange structures 304, 306 can be integrally formed as shown in FIGS. 2-3. Alternatively, the second flange structure 306 can be a separate component coupled to the first flange structure 204 via any suitable adhe-sive or coupling means.

The first flange structure 304 can include the first and second faces 212, 214. The first face 212 can have an annular channel 308 formed therein sized and shaped to receive at least a portion of the sealing member 202. The channel 308 can be defined by a u-shaped recess (as shown in FIG. 3) formed in the first face 212 or a notch (not shown) formed along a peripheral edge of the first face 212.

The ring gasket 202 can snuggly fit in the channel 308 or be captured in the channel 308. The ring gasket can also be coupled to the channel 308 via an adhesive or other suitable coupling means. In any event, the ring gasket 202 can form seal against the walls of the channel 308.

The second flange structure 306 can have an outer diameter 312 smaller than the outer diameter 314 of the first flange structure 304. The second flange structure 306 has a third face 350 extending transversely or perpendicularly from the second face 214 of the first flange structure 304. The second flange structure 306 has the ring gasket 204 extending around a periphery of its circumferential edge portion 310. More particularly, the third face 350 has the ring gasket 204 extending therearound. Accordingly, the second ring gasket 204 is sized and shaped so that an inner circumference resiliently engages the circumferential edge portion 310 and the third face 350 when extended around the periphery of the second flange structure 306.

The ring gasket 204 can be snuggly fitted around the third face 350 or coupled to one or more of the flange structures 304, 306 via an adhesive or other suitable coupling means. In any event, the ring gasket 204 can form a seal against the second face 214 of the first flange structure 304 and the third face 350 of the second flange structure 306.

The second flange structure 306 can alternatively include a channel (not shown) sized and shaped to receive at least a portion of the ring gasket 204. In such a scenario, the channel (not shown) of the second flange structure 306 can be vertically aligned with the channel 308 of the first flange structure 304, i.e., the channel (not shown) of the second flange structure 306 can reside directly below the channel 308 of the first flange struc-ture 304.

The ring gaskets 202, 204 are formed of a resilient material that deforms in response to a compressive force exerted thereon so as to form a fluid-tight seal between the body 206 and a surrounding structure (e.g., the cover 106 shown in FIG. 1 and the housing 104 shown in FIG. 1). Such materials include, but are not limited to, elastomeric materials (e.g., a silicone rubber), or fluoropolymer materials. The ring gaskets 202, 204 can have any shape selected in accordance with a particular filtration system application provided that the shape corresponds to a profile of the flange structure. For example, the ring gaskets 202, 204 can have a circular shape (as shown in FIG. 2), a hex shape (not shown), and/or a rectangular shape (not shown). The ring gaskets 202, 204 can have the same or different diameters.

Figure 4:
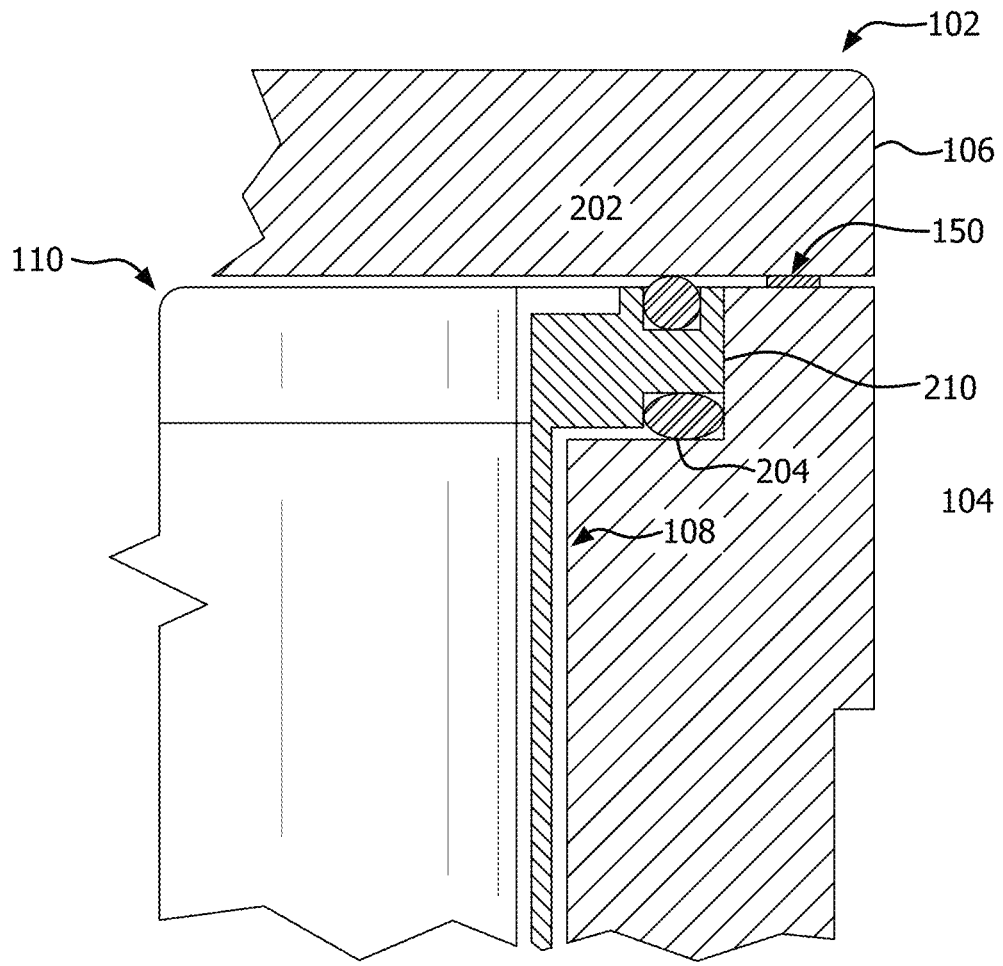
FIG. 4 is an illustration of the sealing members of FIGS. 2-3 providing a fluid-tight seal between the filter basket and a surrounding structure.

A schematic illustration of the ring gaskets 202, 204 of the filter basket 108 providing fluid-tight seals between the filter basket 108 and the surrounding structures (e.g., the pressurized filter housing 102 of FIG. 1) is provided in FIG. 4. As shown in FIG. 4, the ring gasket 202 is disposed between the flange 210 of the filter basket 108 and the cover 106 of the pressurized filter housing 102 so as to form a fluid-tight seal therebetween. Similarly, the ring gasket 204 is disposed between the flange and the body 104 of pressurized filter housing 102 so as to form a fluid-tight seal therebetween. The fluid-tight seals are provided when a pressure is applied to the filter basket 108 by the cover 106 of the pressurized filter housing 102. As a result of the fluid-tight seals, the dual ring basket design provides a filtration system 100 with maximum sealing efficiency that is achieved with minimal effort and force.

Figure 5:
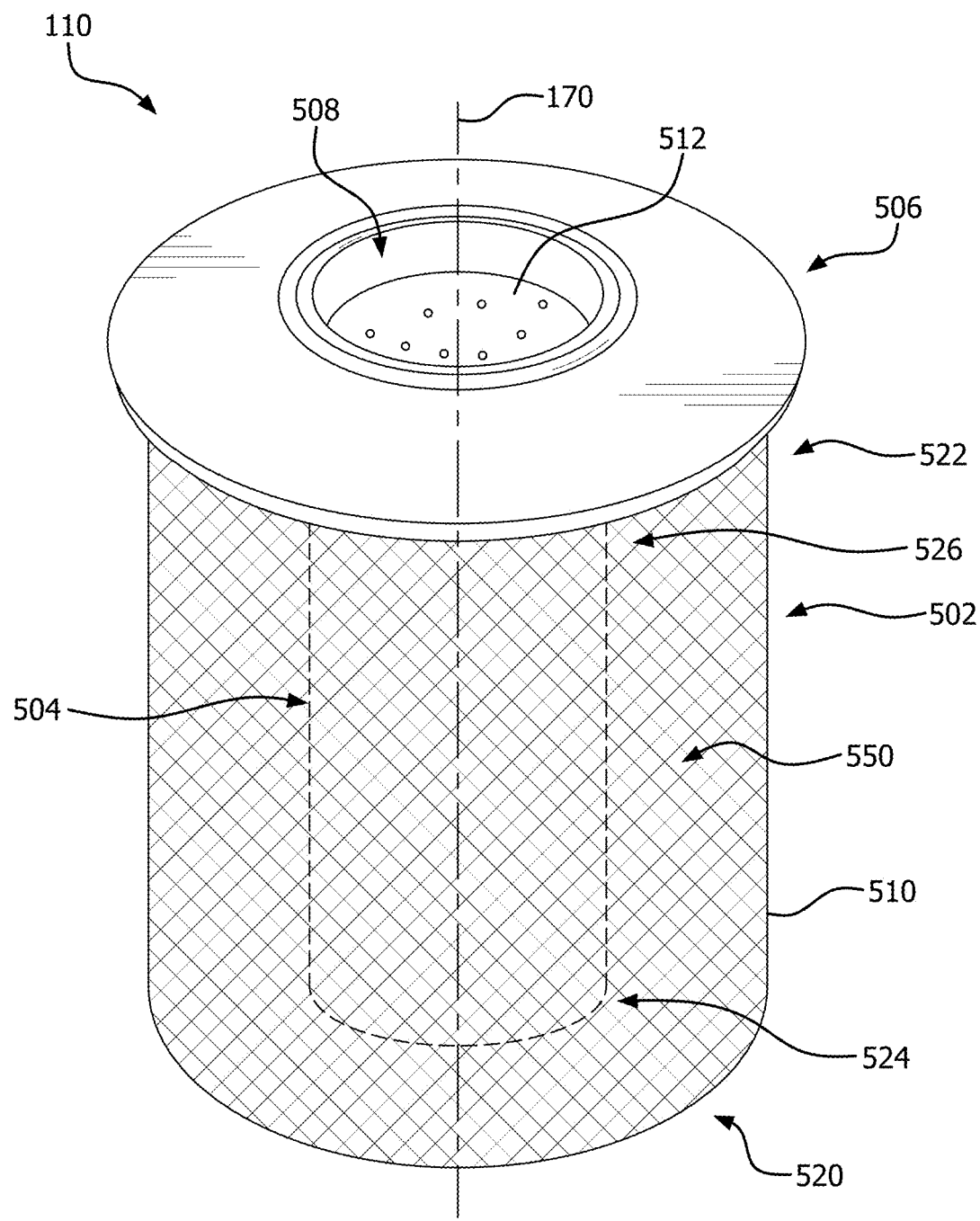
FIG. 5 is a perspective view of a filter element assembly of FIG. 1.
Figure 6:
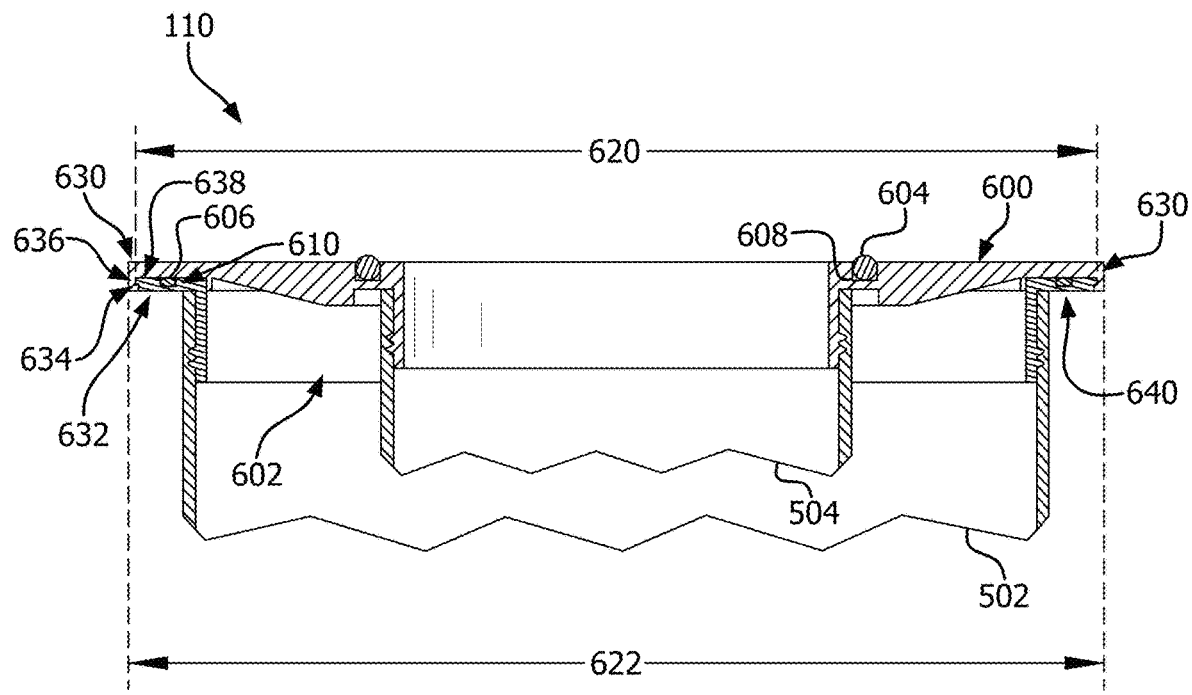
FIG. 6 is a cross-sectional view of the filter element assembly shown in FIG. 5.

The filter element assembly 110 will now be described in relation to FIGS. 5-7. A perspective view of the filter element assembly 110 is provided in FIG. 5. A cross-sectional view of the filter element assembly 110 is provided in FIG. 6. As shown in FIGS. 5-6, the filter element assembly 110 includes an outer filter element 502 and an inner filter element 504 affixed to a collar 506. A granular filter material or other filter material may optionally be disposed in a loading cavity, space or channel 550 provided between the two filter elements 502, 504. The granular material is not visible in FIG. 5 simply for ease and clarity of illustration. The filter element assembly can have any dimensions (length and width) selected in accordance with a particular filtration application.

The inner filter element 504 is designed to be mechanically stable such that its overall shape is maintained throughout use of the filter element assembly 110 without the use of any support structure (e.g., a support basket). The inner filter element 504 may be at least partially formed of a monofilament material to provide the mechanical stability thereto. The inner filter element 504 maximizes the percentage of open area relative to filtration which results in an improved capacity for fluid flow (as compared to systems which require a support basket) with minimal pressure loss and an increased filtration surface area.

The collar 506 comprises two collar pieces 600, 602 coupled to each other, a sealing member 604 disposed in a channel 608 formed in the upper collar piece 600, and another sealing member 606 disposed in a channel 610 formed in the lower collar piece 602. The two collar pieces 600, 602 are designed to provide the collar with a flange that rests on the support basket's lateral flange during use of the filtration system 100. The basket flange height and the collar height are designed to allow the sealing member 604 to be compressed by cover 106 as it is being closed and during the time when the cover is in its closed position. The sealing members 604, 606 can include, but are not limited to, gaskets.

Each collar piece 600, 602 can be made of a semi-rigid material (such as a thermo-plastic). The collar pieces 600, 602 can be coupled to each other via a weld, threads, an adhesive, a snap-fit and/or other coupling means. The lower collar piece 602 can be de-coupled from the upper collar piece 600 so that the inner and/or outer filter elements 502, 504 can be exchanged with another filter element at the discretion of a user. In this way, the present filter element assembly allows for an easy user friendly way to customize a filtration system based on the particular parameters of any given application at any given time. The collar 506 will be described in more detail below in relation to FIGS. 8-21.

Sealing member 604 is provided to (1) form a fluid-tight seal between the filter element assembly 110 and the filter housing 102 and (2) prevent the fluid from bypassing the inner filter element 504 via seepage through the crack between the upper and lower collar pieces 600, 602. The cover 106 also applies a downward pressure (or compressive force) on the collar 506 when resting in the annular channel 118 disposed in the top of the filter housing 102. As a result of the applied pressure (or compressive force), sealing member 604 provides a fluid-tight seal between the collar 506 and the filter housing 102.

Sealing member 606 is provided to (1) form a fluid-tight seal between the two collar pieces 600, 602 and (2) prevent the fluid from bypassing the inner filter element 504 via seepage through the crack between the upper and lower collar pieces 600, 602. When the collar pieces 600, 602 are coupled to each other, the sealing member 606 is compressed therebetween whereby the fluid-tight seal is provided. The compression and tolerances of the sealing members 604, 606 are selected specifically to ensure that a fluid under pressure does not bypass the inner filter element 504 when the filter system is in use.

Each filter element 502, 504 is formed from a filter material 510, 512 that is coextensive with a surface thereof. Each filter element 502, 504 has a tubular form that is closed at a first end and affixed to the collar 506 at a second end opposed to the first end. The inner filter element 504 is coupled to the collar 506 so as to define an input orifice 508 of the filter element assembly 110. The filter materials 510, 512 are generally configured to filter a fluid flowing from the input orifice 508 into the filter element assembly 110.

The filter materials 510, 512 can be the same or different. Each filter material 510, 512 can include one or more layers of filtering medium having a number of pores to control fluid flow. The filtering medium can be selected to comprise a material that is suitable for a particular filtration application. Such materials include, but are not limited to, a micro-fiber (e.g. a polyester, polypropylene, fiberglass, polyamide, or fluorocarbon) or a monofilament (e.g. a nylon or a polypropylene monofilament). Each filter material 510, 512 can have an identical pore structure, a graded pore structure, or a tapered pore structure. A tapered or graded pore structure provides a filter material 510, 512 whereby a pore size can decrease in the direction of fluid flow, i.e. from an input orifice 508 of the filter element assembly 110 through the filter element 502, 504.

Figure 7:
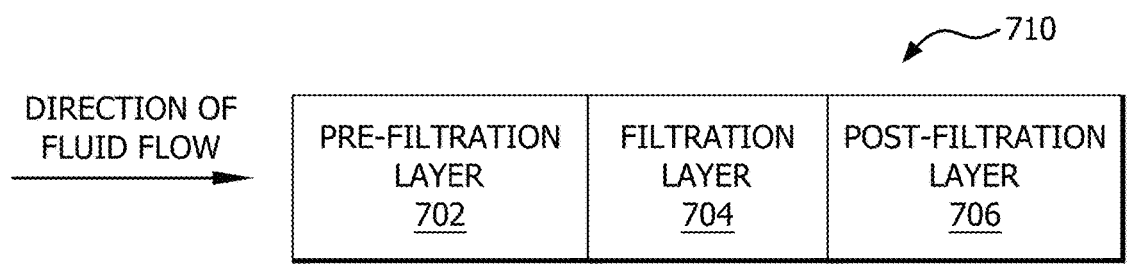
FIG. 7 is an illustration of a diagram of filter materials used to form the filter elements of FIG. 5.
Figure 8:
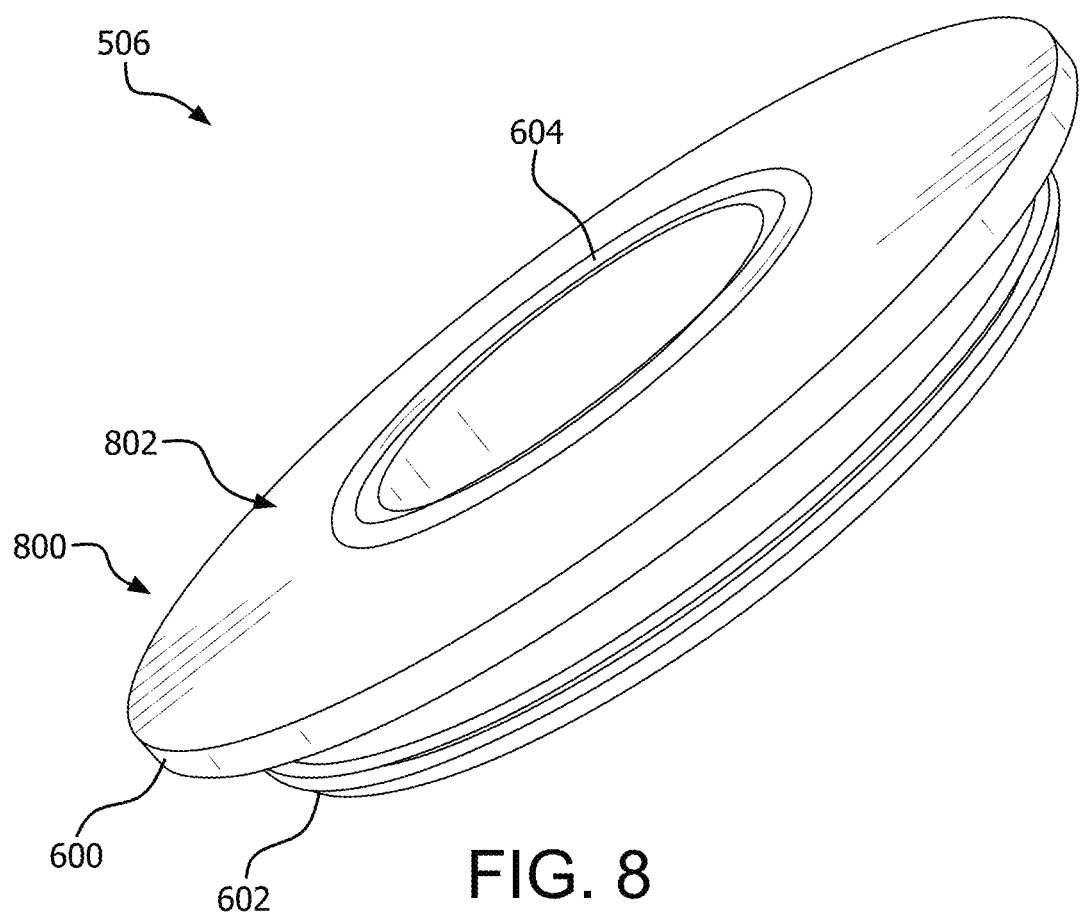
FIG. 8 provides a perspective view of the collar shown in FIG. 5.
Figure 9:
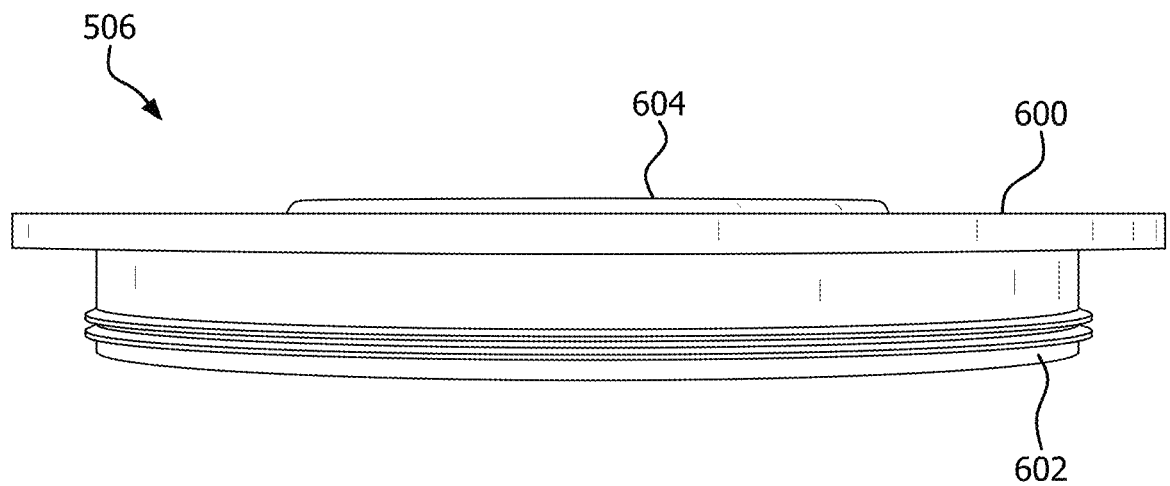
FIG. 9 provides a side view of the collar.

Referring now to FIG. 7, there is provided a diagram of the structure of a filter material 710 used to form the filter element(s) 502, 504. The filter material 710 can comprise a pre-filtration layer 702, a filtration layer 704, and a post-filtration layer 706. Each layer 702, 704, 706 can be co-extensive with an entire surface area of the filter element 502, 504. The pre-filtration layer 702 is the inside layer, and thus would be the inside of the filter element 502, 504. The pre-filtration layer 704 can be referred to as the upstream layer. The post-filtration layer 706 is the outside layer, and thus would be the outside of the filter element 502, 504. The post-filtration layer 706 can be referred to as the downstream layer. The pre-filtration layer 702, the filtration layer 704, and the post-filtration layer 706 can be joined to each other. For example, the pre-filtration layer 702, the filtration layer 704, and the post-filtration layer 706 can be joined using an ultrasonic welding technique.

The pre-filtration layer 702 can include a pre-filter material which can be co-extensive with an entire surface area of the filter element. The pre-filter material can comprise one or more layers of a pre-filtering medium. The pre-filtering medium can comprise a mono filament (e.g., nylon mono filament) and/or a micro-fiber (e.g. a polypropylene microfiber). The pre-filtration layer 702 can collect large particles from a fluid being pumped through the filter element 702.

The pre-filtration material can further comprise one or more layers of an adsorbent medium for removing chlorine, odor, sediment, or other organic contaminants from a fluid. The adsorbent medium can be composed of a granular material (not shown) disposed between thin wall substrates (not shown). The adsorbent medium (not shown) can be fixed between the thin wall substrates (not shown) or embedded in fibers of the thin wall substrates (not shown) using any physically restrictive method commonly used in the art for manufacturing an adsorbent medium, such as a wet bonding tech-nique, a heat bonding technique, an entangling method, or a pressure bonding technique. The granular material (not shown) can be selected to include activated carbon and/or activated charcoal. The activated carbon and/or activated charcoal can be selected to have a large surface area for providing bonding sites for contaminant adsorption.

The pre-filtration material can also include one or more layers of a diffusion medium (not shown) to act as spacers between the layers of a pre-filtering medium and/or an adsorbent medium. In such a scenario, the pre-filtration material can include alternating layers of the adsorbent medium (not shown) and the diffusion medium (not shown). The diffusion medium (not shown) can be made from any suitable material that is temperature and fluid compatible with the filtering application to be carried out. For example, the diffusion medium (not shown) can be made of a thermoplastic having polypropylene for low temperature filtering applications. The diffusion medium (not shown) can be made of a thermoplastic having nylon for high temperature filtering applications. The diffusion medium (not shown) can be composed of a mesh material. For example, the diffusion medium (not shown) can comprise a non-adsorbent mesh material formed of a plurality of parallel strands defining lateral passages transverse to layers of adsorbent medium. The lateral passages diffuse a liquid and/or a fluid over a surface area of a layer of adsorbent medium (not shown) downstream there-from.

The filtration layer 704 can include a filter material which can be co-extensive with an entire surface area of the filter element. The filter material can comprise one or more layers of a filtering medium. The filtering medium can be selected to include an absolute-rated micro-fiber. The filtering medium can also be selected to include synthetic fibers, e.g., polyester or polypropylene. The filtering medium can collect particles of contaminants from a fluid being pumped through the filter element.

The filter material can further comprise one or more layers of the adsorbent medium for removing organic contaminants from a fluid. The adsorbent medium can be the same as or substantially similar to the adsorbent medium described above in relation to the pre-filtration material. The filter material can also include one or more layers of a diffusion medium to act as spacers between the layers of a filtering medium and/or an adsorbent medium. The diffusion medium can be the same as or substantially similar to the diffusion medium described above in relation to the pre-filtration material.

The filtration layer 704 can also include a support medium which can be co-extensive with an entire surface area of the filter element. The support medium can be a structural layer composed of a monofilament, such as a polypropylene monofilament. The support medium can be joined to the filter material. For example, the support medium can be joined to the filter material using an ultrasonic welding technique. The support medium can provide structural support to the filter element for sustaining high pressure fluid flow.

The post-filtration layer 706 can comprise a support jacket which can be co-extensive with the surface area of the filter element. For example, the support jacket can be composed of a fibrous fabric, such as a non-woven spunbond material. The support jacket can provide support to the filter element and prevent fiber migration downstream.

The collar 506 will now be described in more detail in relation to FIGS. 6 and 8-21. With reference to FIGS. 6 and 8-21, the collar 506 comprises sealing members 604, 606 and a body 800 formed of the two collar pieces 600, 602 coupled to each other. The upper collar piece 600 comprises a channel 608 formed in an upper surface 1000. The channel 608 is sized and shaped for receiving and maintaining the sealing member 604 when inserted therein. The lower collar piece 602 also comprises a channel 610 formed in an upper surface 1002 thereof. The channel 610 is sized and shaped for receiving and maintaining the sealing member 606 when inserted therein. The sealing member 606 provides a seal between the upper and lower collar pieces 600, 602 when the collar 506 is assembled.

The upper collar piece 600 comprises a flange 630 configured to snap-fit engage with a flange 632 of the lower collar piece 602. The flange 630 has an insert space 640 formed therein for receiving a flange 632 of the lower collar piece 602. The snap-fit engagement is facilitated by (i) a groove 634 formed in a downward protruding sidewall 636 of flange's insert space 640 of the upper collar piece 600 and (ii) a structure 638 protruding out and away from the flange 632 of the lower collar piece 602. The protruding structure 638 is sized and shaped to frictionally fit in the groove 634. Groove 634 and protruding structure 638 can extend around all or a portion of the peripheral circumference of the collar pieces 600, 602, respectively. In some scenarios, more than one groove and protruding structure is provided to facilitate a plurality of snap-fit engagements between the flanges of the upper and lower collars.

As noted above, the upper collar piece 600 is coupled to filter element 504, while the lower collar piece 602 is coupled to filter element 502. Filter element 504 has smaller overall dimensions then filter element 502, such that filter element 504 can be inserted into and reside within filter element 502 when the collar is assembled thereby forming the filter element assembly 110. Because of this arrangement, filter element 504 is referred to herein an inner filter element of the filter element assembly 110 and filter element 502 is referred to as an outer filter element of the filter element assembly 110. The inner/outer filter element configuration is facilitated by the designs of the collar pieces 600, 602. The design of the upper collar piece 600 will be discussed in relation to FIGS. 12-16. The design of the lower collar piece 602 will be discussed in relation to FIGS. 17-21.

As shown in FIGS. 12-16, the upper collar piece 600 is designed to have a central aperture 1200 formed in a body 1202 thereof. The body 1202 generally includes an annular sidewall 1204 disposed around a central axis 1250. The annular sidewall 1204 provides a structure to which filter element 504 can be coupled. This coupling can be achieved via a weld, adhesive and/or other coupling means. One or more ridges 1302 may be provided on annular sidewall 1204 to also facilitate the coupling and/or retention of the filter element to the upper collar piece 600. The annular sidewall 1204 can have any shape selected in accordance with a particular filtration application. Such shapes include, but are not limited to, circular shapes (as shown in FIGS. 12-16), hex shapes (not shown), and rectangular shapes (not shown).

The flange 630 extends radially outward from a proximal end 1206 of the annular sidewall 1204. The flange 630 can have any shape selected in accordance with a particular filtration system application. For example, the flange 630 can have a circular shape (as shown in FIGS. 12-16), a hex shape (not shown), and/or a rectangular shape (not shown). For convenience, the present solution is described in terms of a circular profile.

Figure 12:
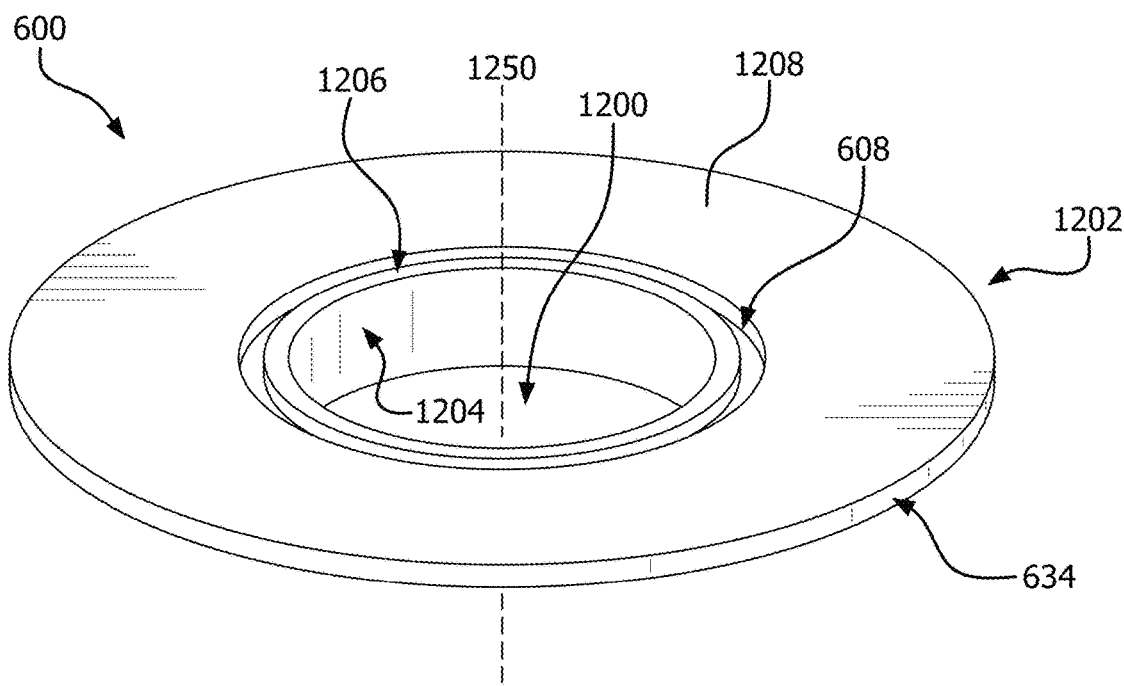
FIG. 12 provides a top perspective view of an upper collar piece.
Figure 13:
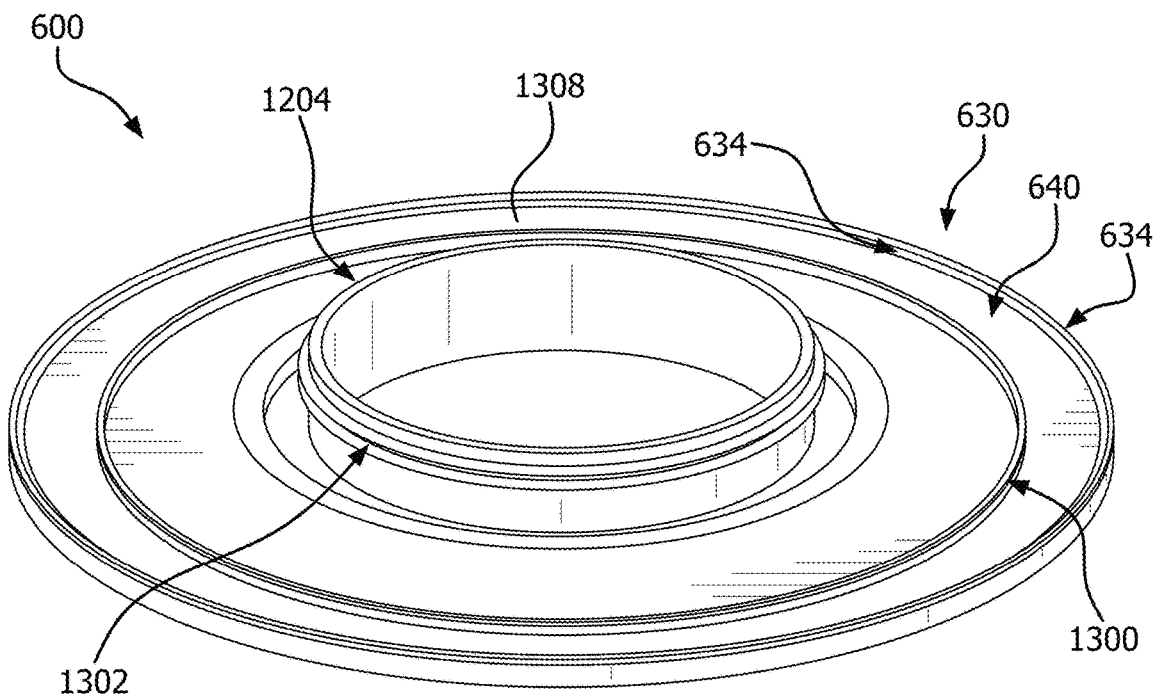
FIG. 13 provides a bottom perspective view of the upper collar piece.
Figure 14:
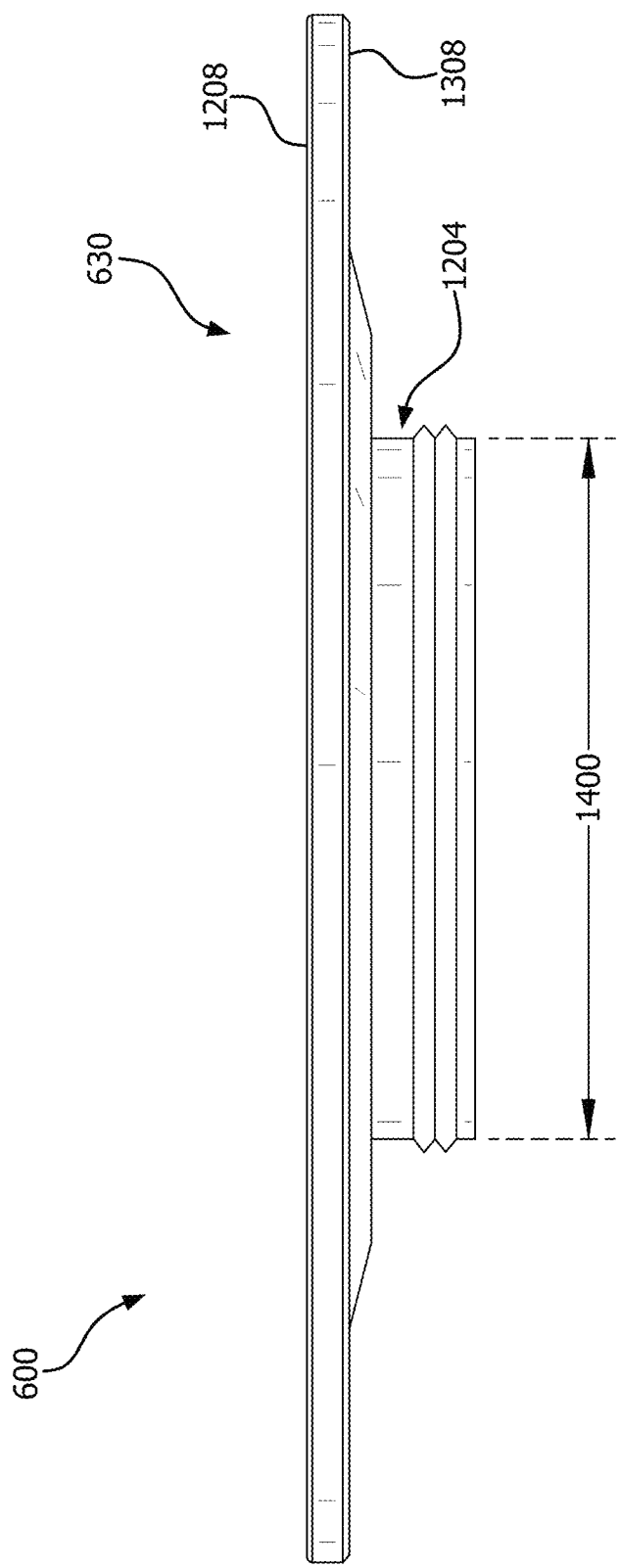
FIG. 14 provides a side view of the upper collar piece.
Figure 15:
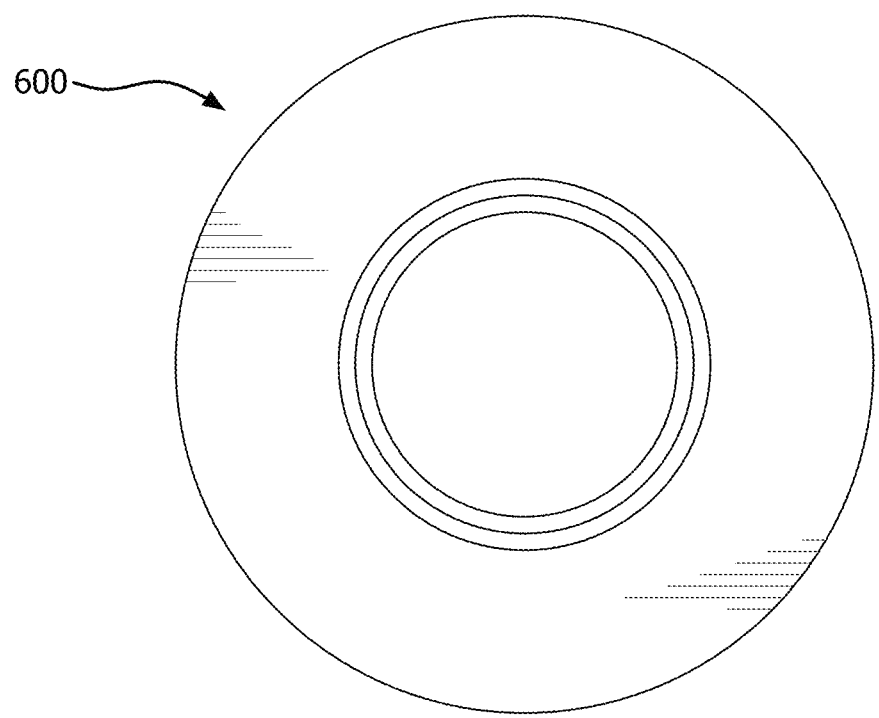
FIG. 15 provides a top view of the upper collar piece.
Figure 16:
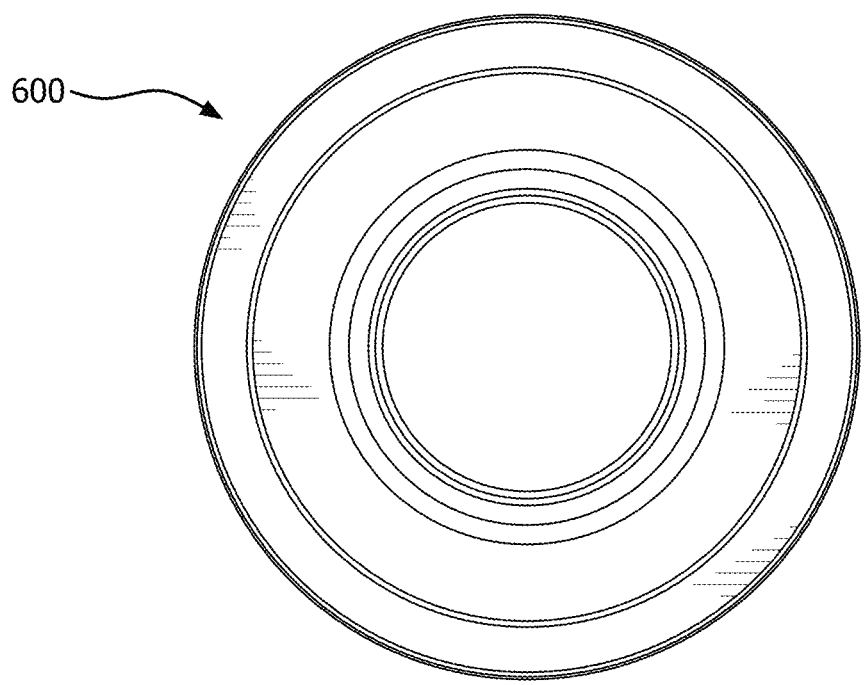
FIG. 16 provides a bottom view of the upper collar piece.

As shown in FIGS. 12-13, the flange 630 has a first face 1208 and an opposing second face 1308. Each of the faces 1208, 1308 extends traverse to the annular sidewall 1204. The first face 1208 is generally planar and has an annular channel 608 formed thereon that is sized and shaped to receive at least a portion of the sealing member 604. The annular channel 608 can be defined by a u-shaped recess (shown in FIG. 12) formed in the surface of the first face 1208 or a notch (not shown) formed along a peripheral edge of the first face. The sealing member 604 can be snuggly fitted or captured in the channel 608. The sealing member 604 can also be coupled to the channel 608 via an adhesive or other coupling means. In any event, the sealing member 604 can form a seal against the walls of the channel 608.

Figure 10:
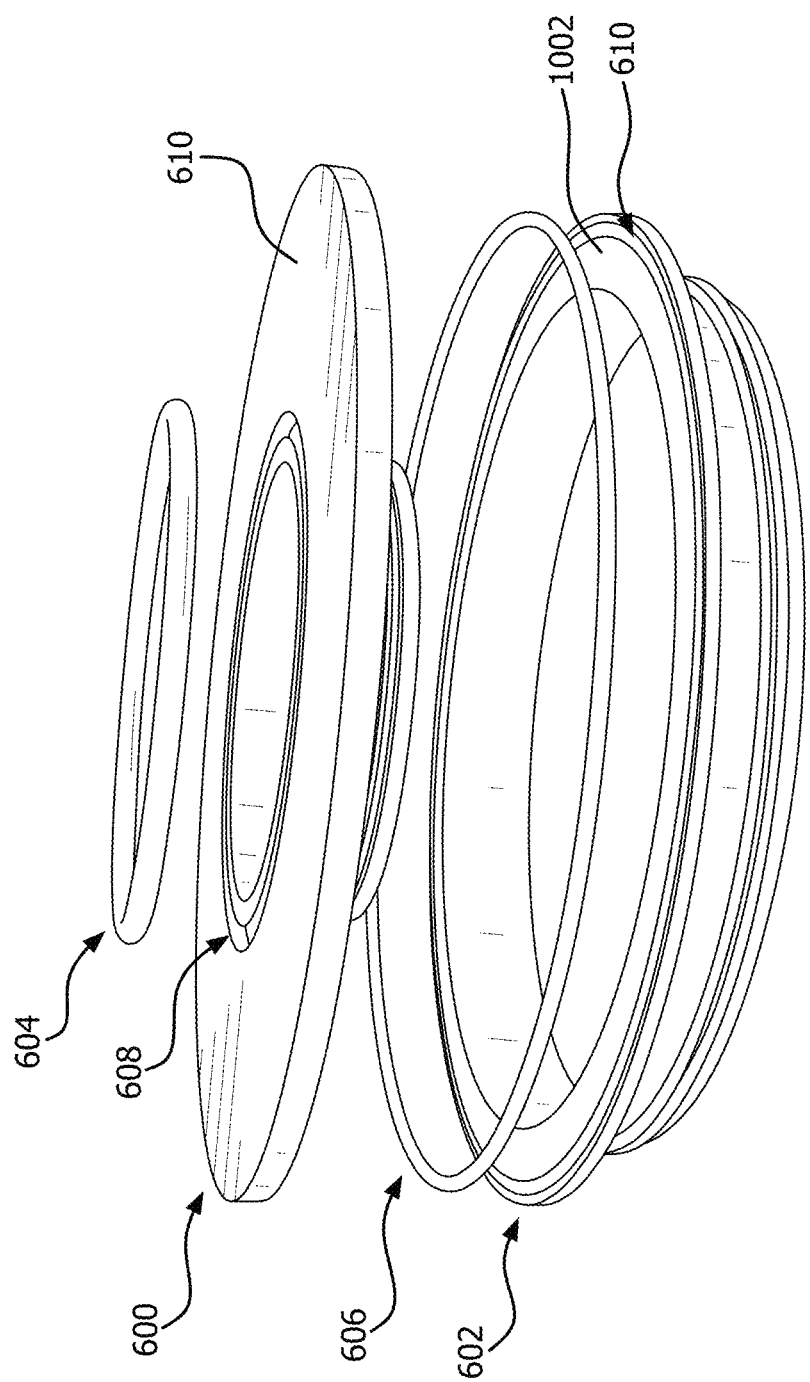
FIG. 10 provides a top perspective exploded view of the collar.
Figure 11:
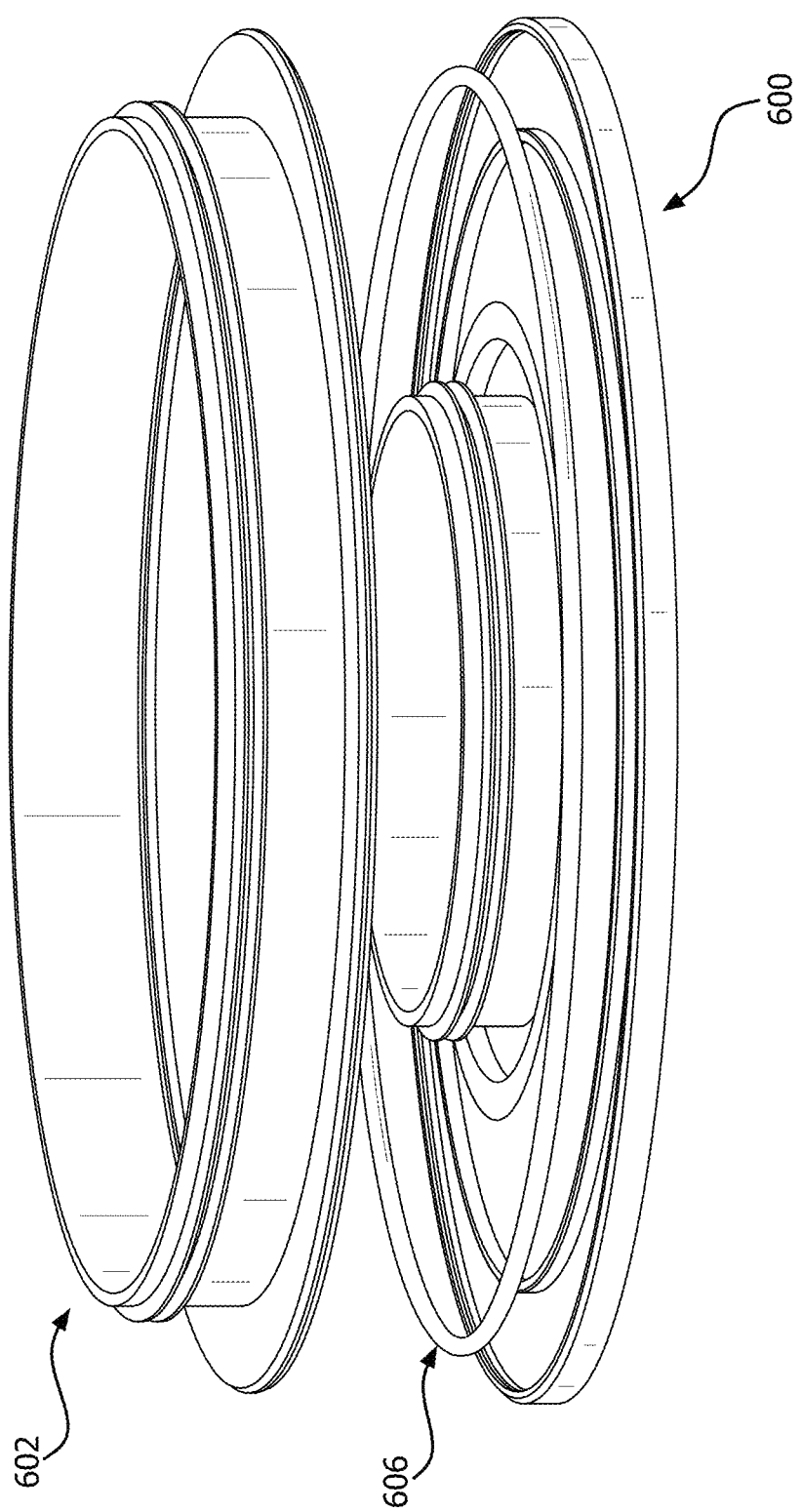
FIG. 11 provides a bottom perspective exploded view of the collar.

The sealing member 604 can be formed of a resilient material that can deform in response to a compressive force exerted thereon so as to form a fluid-tight seal between the body 1202 and a surrounding structure (e.g., the cover 106 shown in FIG. 1 and the housing 104 shown in FIG. 1). Such materials include, but are not limited to, elastomeric materials (e.g., silicone rubber), or fluoropolymer materials. The sealing member 604 can have any shape selected in accordance with a particular filtration system application provided that the shape corresponds to a profile of the flange structure. For example, the sealing member 604 can have a circular shape (as shown in FIG. 10), a hex shape (not shown), and/or a rectangular shape (not shown).

The second face 1308 is generally planar and has two annular protruding structures 638, 1300 extending out and away therefrom. The protruding structures 638, 1300 define the insert space 640 for receiving the flange 632 of the lower collar piece 602.

As shown in FIGS. 17-21, the lower collar piece 602 is designed to have a central aperture 1700 formed in a body 1702 thereof. The body 1702 generally includes an annular sidewall 1704 disposed around a central axis 1750. The annular sidewall 1704 provides a structure to which filter element 502 can be coupled. This coupling can be achieved via a weld, adhesive and/or other coupling means. One or more ridges 1706 may be provided on annular sidewall 1704 to also facilitate the coupling and/or retention of the filter element to the lower collar piece 602. The annular sidewall 1704 can have any shape selected in accordance with a particular filtration application. Such shapes include, but are not limited to, circular shapes (as shown in FIGS. 17-21), hex shapes (not shown), and rectangular shapes (not shown). The annular sidewall 1704 can have a width or diameter 1900 that is larger than the width or diameter 1400 of the annular sidewall 1204 of the upper collar piece 600. In this way, two filter bags can be selectively provided with a single collar, where the smaller filter bag resides inside the larger filter bag.

The flange 632 extends radially outward from a proximal end 1708 of the annular sidewall 1704. The flange 632 can have any shape selected in accordance with a particular filtration system application. For example, the flange 632 can have a circular shape (as shown in FIGS. 17-21), a hex shape (not shown), and/or a rectangular shape (not shown). For convenience, the present solution is described in terms of a circular profile.

Figure 17:
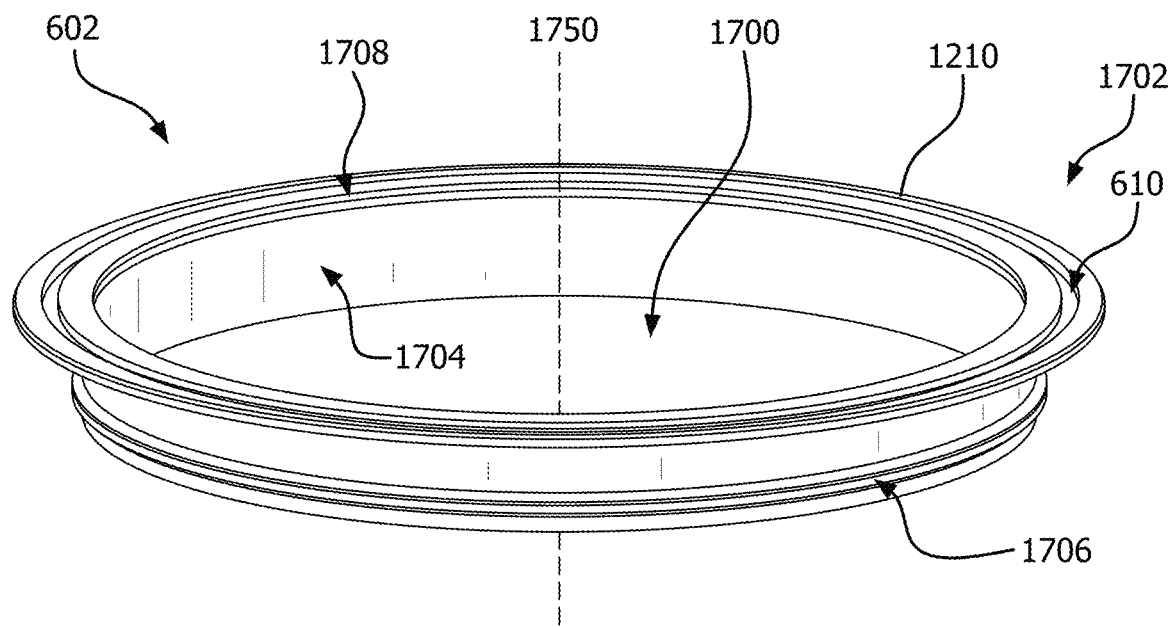
FIG. 17 provides a top perspective view of a lower collar piece.
Figure 18:
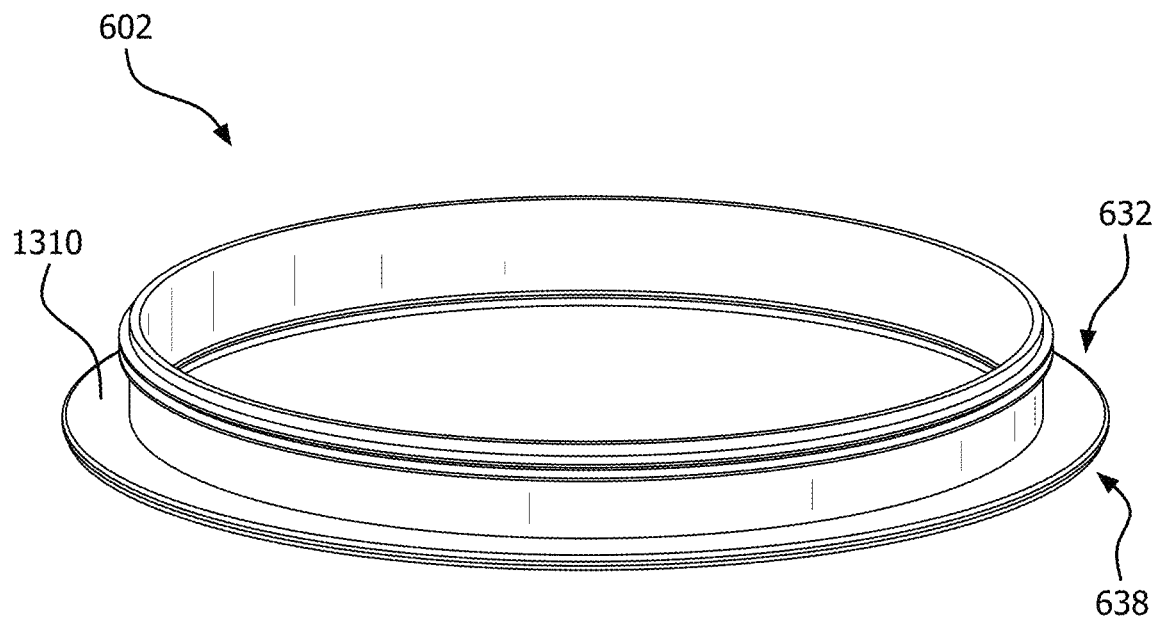
FIG. 18 provides a bottom perspective view of the lower collar piece.
Figure 19:
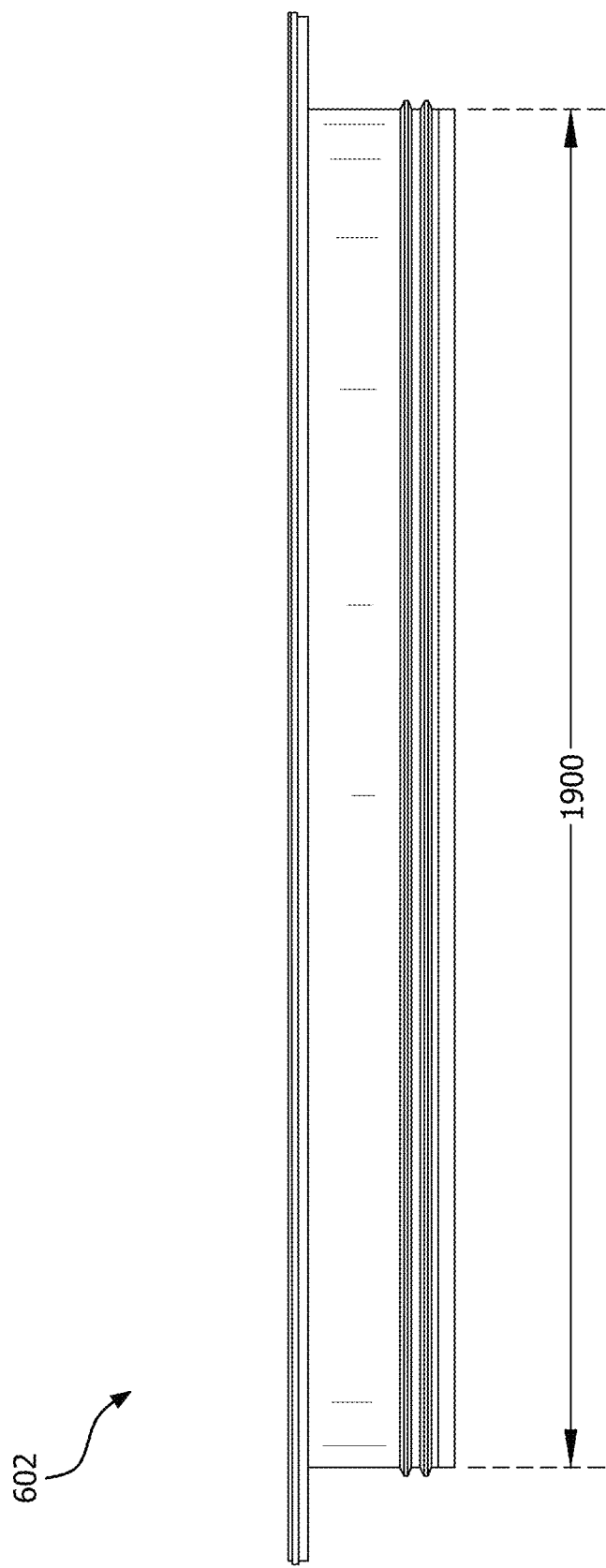
FIG. 19 provides a side view of the lower collar piece.
Figure 20:
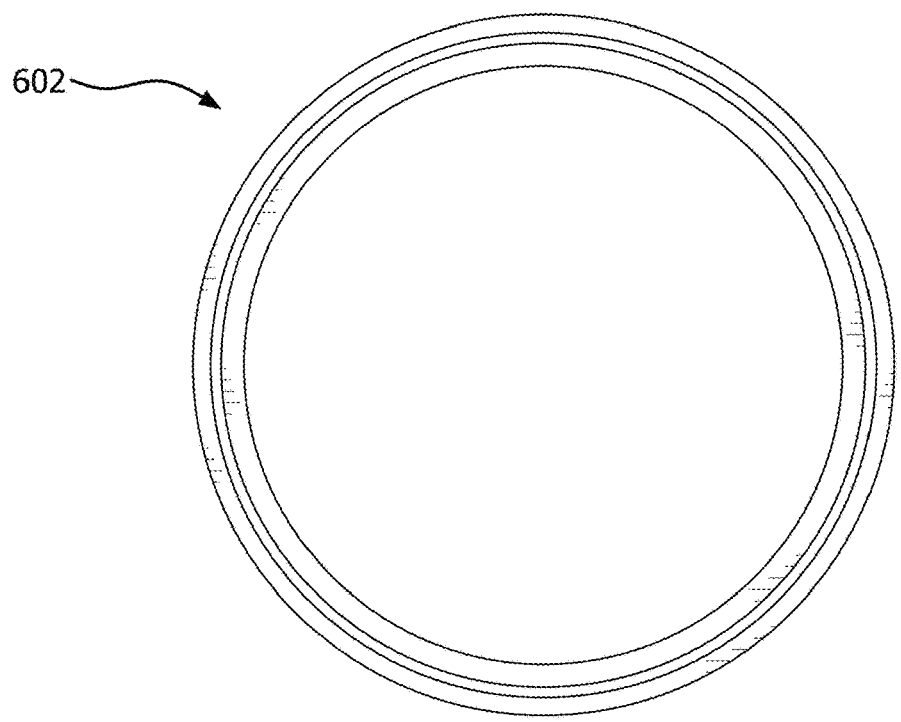
FIG. 20 provides a top view of the lower collar piece.
Figure 21:
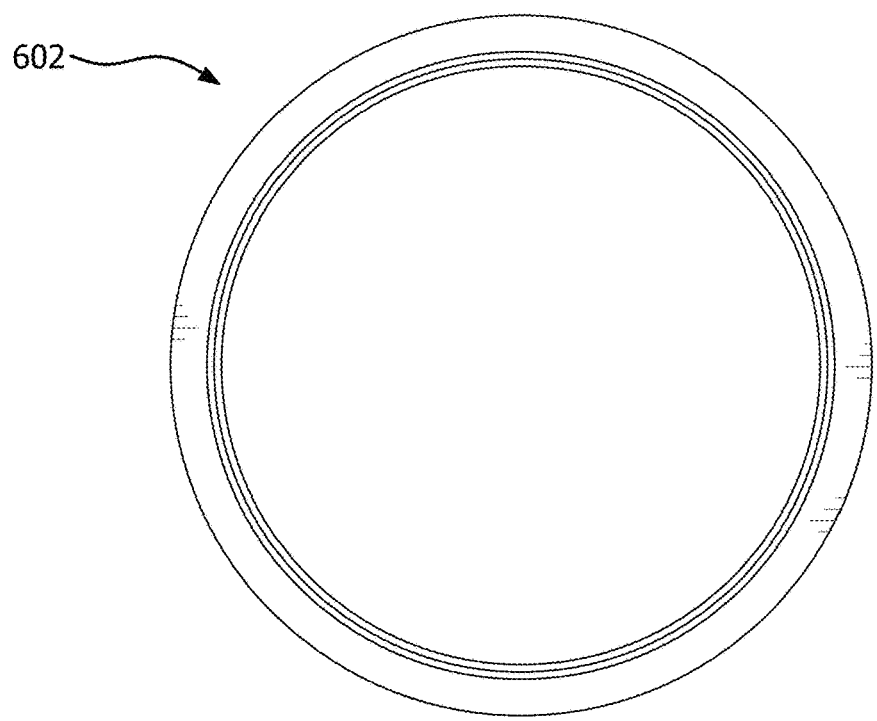
FIG. 21 provides a bottom view of the lower collar piece.

As shown in FIGS. 17-18, the flange 632 has a first face 1210 and an opposing second face 1310. Each of the faces 1210, 1310 extends traverse to the annular sidewall 1704. The first face 1210 is generally planar and has an annular channel 610 formed thereon that is sized and shaped to receive at least a portion of the sealing member 606. The annular channel 610 can be defined by a u-shaped recess (shown in FIG. 17) formed in the surface of the first face 1210 or a notch (not shown) formed along a peripheral edge of the first face. The sealing member 606 can be snuggly fitted or captured in the channel 610. The sealing member 606 can also be coupled to the channel 610 via an adhesive or other coupling means. In any event, the sealing member 606 can form a seal against the walls of the channel 610.

The sealing member 606 can be formed of a resilient material that can deform in response to a compressive force exerted thereon so as to form a fluid-tight seal between the body 1702 and a surrounding structure (e.g., the cover 106 shown in FIG. 1 and the housing 104 shown in FIG. 1). Such materials include, but are not limited to, elastomeric materials (e.g., silicone rubber), or fluoropolymer materials. The sealing member 606 can have any shape selected in accordance with a particular filtration system application provided that the shape corresponds to a profile of the flange structure. For example, the sealing member 606 can have a circular shape (as shown in FIG. 10), a hex shape (not shown), and/or a rectangular shape (not shown).

The second face 1310 is generally planar and has the structure 638 protruding out and away therefrom. The protruding structure 638 is sized and shaped to be slidingly received in and frictionally fit in the groove 634 of the upper collar piece 600. This arrangement of the protruding structure 638 and groove 634 allows the lower collar piece 602 to be selectively coupled to and decoupled from the upper collar piece 600. In this way, the two collar pieces 600, 602 provide a modular collar structure. In this regard, each of the collar pieces 600, 602 is interchangeable with one or more other collar pieces. The interchangeable collar pieces can be coupled to different sized and/or types of filter elements.

Figure 22:
FIG. 22 provides a flow diagram of an illustrative method for using a filter element assembly in accordance with the present solution.

FIG. 22 provides a flow diagram of an illustrative method 2200 for using a filter element assembly (e.g., filter element assembly 110 of FIG. 1). Method 2200 begins with 2202 and continues with 2204 where a first sealing member (e.g., sealing member 606 of FIG. 6) is placed in a channel (e.g., channel 610 of FIG. 6) formed in a first collar piece (e.g., lower collar piece 602 of FIG. 6). The first collar piece has a first filter element (e.g., filter element 502 of FIG. 5) coupled thereto. The first filter element has a tubular form that is closed at a first end (e.g., end 520 of FIG. 5) and affixed to the first collar piece at an opposing second end (e.g., end 522 of FIG. 5) to at least partially define an input orifice of the first collar piece.

In 2206, a second filter element (e.g., filter element 504 of FIG. 5) is inserted into the input orifice of the first collar piece and into the first filter element. The second filter element is coupled to a second collar piece (e.g., upper collar piece 600 of FIG. 6) and has an overall size smaller than an overall size of the first filter element. The second filter element can have a tubular form that is closed at a first end (e.g., end 524 of FIG. 5) and affixed to the second collar piece at an opposing second end (e.g., end 526 of FIG. 5) to at least partially define an input orifice (e.g., input orifice 508 of FIG. 5) of the second collar piece.

In 2208, the first collar piece is caused to snap-fit engage a flange (e.g., flange 630 of FIG. 6) of the second collar piece. The first sealing member is compressed between the first and second collar pieces when the first collar piece is caused to snap-fit engage the flange of the second collar piece, as shown by block 2210. In this way, the first sealing member can be used to provide a seal between the first and second collar pieces when they are snap-fit engaged with one another, as shown by block 2212.

In 2214, a second sealing member is placed in a channel (e.g., channel 608 of FIG. 6) formed in an exposed surface (e.g., surface 802 of FIG. 2) of the second collar piece. The second sealing member (e.g., sealing member 604 of FIG. 6) is used in 2216 to provide a seal between the second collar piece and a filter housing (e.g., filter housing 102 of FIG. 1).

In 2218, a fluid is received in the input orifice (e.g., input orifice 508 of FIG. 5) of the second collar piece. A first-stage filtering process is performed in 2220 using the second filter element to remove contaminants from the fluid. A subsequent second-stage filtering process is performed in 2222 using the first filter element to further remove contaminants from the fluid. The fluid flows from the input orifice of the second collar piece and through the second filter element during the first-stage filtering process. The fluid flows from the second filter element through the first filter element during the subsequent second-stage filtering process.

Method 2200 may continue with optional operations of blocks 2224-2228. The optional operations of block 2224 involve: (i) replacing the first collar piece with an interchangeable third collar piece having a third filter element coupled thereto; or (ii) replacing the second collar piece with an interchangeable fourth collar piece having a fourth filter element coupled thereto. Operation (i) may be achieved by: causing the first collar piece to no longer snap-fit engage the flange of the second collar piece; and causing the interchangeable third collar piece to snap-fit engage the flange of the second collar piece. The interchangeable third collar piece has a third filter element coupled thereto which is different than the first filter element. Operation (ii) may be achieved by: causing the first collar piece to no longer snap-fit engage the flange of the second collar piece; and causing the first collar piece to snap-fit engage a flange of the interchangeable fourth collar piece. The interchangeable fourth collar piece has a fourth filter element coupled thereto which is different than the second filter element.

The operations of block 2226 involve repeating the first-stage filtering process using the second filter element or the fourth filter element to remove contaminants from the fluid or another fluid. The operations of block 2228 involve repeating the second-stage filtering process using the first filter element or the third filter element to further remove contaminants from the fluid or another fluid. Upon completing 2222 or 2228, operations of block 2230 are performed such that method 2200 ends or other operations are performed (e.g., method 2200 returns to 2202).

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method off filtering a fluid, comprising the steps of:
   placing a first sealing member in a channel formed in a first collar piece which has a first filter element coupled thereto, the first filter element having a tubular form that is closed at a first end and affixed to the first collar piece at an opposing second end to define an input orifice of the first collar piece;
   inserting a second filter element coupled to a second collar piece through the input orifice of the first collar piece and into the first filter element, the second filter element having an overall size smaller than an overall size of the first filter element;
   causing the first collar piece to snap-fit engage a flange of the second collar piece the first sealing member sealingly engaging the first and second collar pieces to provide a seal between the first and second collar pieces which are snap-fit engaged with one another;
   receiving a fluid in an input orifice of the second collar piece;
   passing the received fluid through the second filter element in a first-stage filtering process, to remove contaminants from the fluid; and
   passing the fluid which has passed through the second filter element through the first filter element in a subsequent second-stage filtering process, to further remove contaminants from the fluid;
   wherein the received fluid flows from the input orifice of the second collar piece and through the second filter element during the first-stage filtering process, and the fluid flows from the second filter element through the first filter element during the subsequent second-stage filtering process.

2. The method according to claim 1, further comprising:
   placing a second sealing member in a channel formed in an exposed surface of the second collar piece, the second sealing member providing a seal between the second collar piece and a filter housing.

3. The method according to claim 1, further comprising:
   replacing the first collar piece with an interchangeable third collar piece by:

disengaging the first collar piece to no longer snap-fit engage the flange of the second collar piece; and causing the interchangeable third collar piece to snap-fit engage the flange of the second collar piece.

4. The method according to claim 3, wherein the interchangeable third collar piece has a third filter element coupled thereto which is different than the first filter element.

5. The method according to claim 4, further comprising:

repeating the first-stage filtering process by passing the received fluid or another fluid through the second filter element to remove contaminants from the received fluid or another fluid; and repeating the subsequent second-stage filtering process by passing the received fluid or another fluid through the third filter element to further remove contaminants from the fluid or the another fluid.

6. The method according to claim 1, further comprising:

replacing the second collar piece with an interchangeable fourth collar piece by:

disengaging the first collar piece to no longer snap-fit engage the flange of the second collar piece; and causing the first collar piece to snap-fit engage a flange of the interchangeable fourth collar piece.

7. The method according to claim 6, wherein the interchangeable fourth collar piece has a fourth filter element coupled thereto which is different than the second filter element.

8. The method according to claim 7, further comprising:

repeating the first-stage filtering process using the fourth filter element to remove contaminants from the fluid or another fluid; and repeating the subsequent second-stage filtering process by passing the fluid or another fluid through the first filter element to further remove contaminants from the fluid or the another fluid.

9. The method according to claim 1, further comprising:

compressing the first sealing member between the first and second collar pieces when the first collar piece is caused to snap-fit engage the flange of the second collar piece.

* * * * *